United States Patent
Mori et al.

(10) Patent No.: US 10,432,129 B2
(45) Date of Patent: Oct. 1, 2019

(54) AC ROTARY MACHINE CONTROL DEVICE AND ELECTRIC POWER STEERING DEVICE

(71) Applicant: Mitsubishi Electric Corporation, Tokyo (JP)

(72) Inventors: Tatsuya Mori, Tokyo (JP); Akira Furukawa, Tokyo (JP)

(73) Assignee: Mitsubishi Electric Corporation, Chiyoda-ku, Tokyo (JP)

( * ) Notice: Subject to any disclaimer, the term of this patent is extended or adjusted under 35 U.S.C. 154(b) by 0 days.

(21) Appl. No.: 15/743,468

(22) PCT Filed: Oct. 13, 2015

(86) PCT No.: PCT/JP2015/078928
§ 371 (c)(1),
(2) Date: Jan. 10, 2018

(87) PCT Pub. No.: WO2017/064756
PCT Pub. Date: Apr. 20, 2017

(65) Prior Publication Data
US 2018/0219506 A1    Aug. 2, 2018

(51) Int. Cl.
*H02P 27/06* (2006.01)
*H02P 27/04* (2016.01)
(Continued)

(52) U.S. Cl.
CPC ............. *H02P 27/06* (2013.01); *B62D 5/046* (2013.01); *B62D 5/0457* (2013.01);
(Continued)

(58) Field of Classification Search
CPC .......... H02P 21/22; H02P 27/06; H02P 9/305; H02P 29/50; H02P 21/00; H02P 21/14;
(Continued)

(56) References Cited

U.S. PATENT DOCUMENTS 5,365,153 A * 11/1994 Fujita .................... B06B 1/0261
318/34
8,154,230 B2 * 4/2012 Kimura ................... H02P 27/08
318/400.01
(Continued)

FOREIGN PATENT DOCUMENTS

JP    2012-125006 A    6/2012
JP    2012-135100 A    7/2012
(Continued)

OTHER PUBLICATIONS

International Search Report for PCT/JP2015/078928, dated Dec. 8, 2015 (PCT/ISA/210).
(Continued)

*Primary Examiner* — Thai T Dinh
(74) *Attorney, Agent, or Firm* — Sughrue Mion, PLLC; Richard C. Turner

(57) ABSTRACT

To provide an AC rotary machine control device which can superimpose the 5th order and the 7th order harmonic voltages on the AC voltage applied to the AC rotary machine by calculation processing of low processing load, and an electric power steering device provided with the same. An AC rotary machine control device performs middle voltage offset processing that adds offset value to middle voltage command when middle voltage command in three phase basic voltage commands is larger than vibration center voltage, and subtracts offset value from middle voltage command when middle voltage command is smaller than vibration center voltage.

9 Claims, 30 Drawing Sheets

(51) Int. Cl.
*H02P 21/22* (2016.01)
*B62D 5/04* (2006.01)
*H02M 7/5387* (2007.01)
*H02P 6/10* (2006.01)
*H02P 21/13* (2006.01)
*H02P 21/14* (2016.01)

(52) U.S. Cl.
CPC ............ *H02M 7/5387* (2013.01); *H02P 6/10* (2013.01); *H02P 21/13* (2013.01); *H02P 21/14* (2013.01); *H02P 21/22* (2016.02); *H02P 27/04* (2013.01)

(58) Field of Classification Search
CPC ........ H02P 6/10; H02P 27/04; H02M 7/5387; B62D 5/0457
See application file for complete search history.

(56) References Cited

U.S. PATENT DOCUMENTS

| | | | | |
|---|---|---|---|---|
| 8,810,168 B2* | 8/2014 | Tsuji | ........................ | H02P 21/22 318/400.02 |
| 8,897,967 B2* | 11/2014 | Uryu | ..................... | B62D 5/0463 701/41 |
| 9,903,931 B2* | 2/2018 | Omata | .................... | G01R 35/00 |
| 2011/0292700 A1* | 12/2011 | Arakawa | ........... | H02M 7/53871 363/95 |
| 2012/0139380 A1* | 6/2012 | Taniguchi | ............ | H02K 1/2746 310/156.48 |
| 2013/0285591 A1* | 10/2013 | Suzuki | .................... | H02P 25/22 318/724 |
| 2013/0299271 A1* | 11/2013 | Endo | ...................... | B62D 5/046 180/446 |
| 2014/0246999 A1* | 9/2014 | Kezobo | ................. | B62D 5/0484 318/400.23 |
| 2014/0312809 A1* | 10/2014 | Ishida | ..................... | H02P 25/22 318/139 |
| 2016/0118923 A1* | 4/2016 | Kano | ....................... | H02P 25/22 318/400.02 |
| 2016/0126797 A1 | 5/2016 | Nishimura et al. | | |
| 2017/0131378 A1* | 5/2017 | Murata | ................... | B60L 58/10 |

FOREIGN PATENT DOCUMENTS

| | | |
|---|---|---|
| JP | 2014-11944 A | 1/2014 |
| JP | 2014-121189 A | 6/2014 |
| WO | 2015-019507 A1 | 2/2015 |

OTHER PUBLICATIONS

Communication dated Sep. 5, 2018, from Japanese Patent Office in counterpart application No. 2017-545022.

Ahmet M. Hava et al., "Carrier-Based PWM-VSI Overmodulation Strategies: Analysis, Comparison, and Design", IEEE Transactions on Power Electronics, vol. 13, No. 4, Jul. 1998, 16 pages total.

Extended European Search Report dated Apr. 15, 2019 issued by the European Patent Office in counterpart application No. 15906220.7.

* cited by examiner

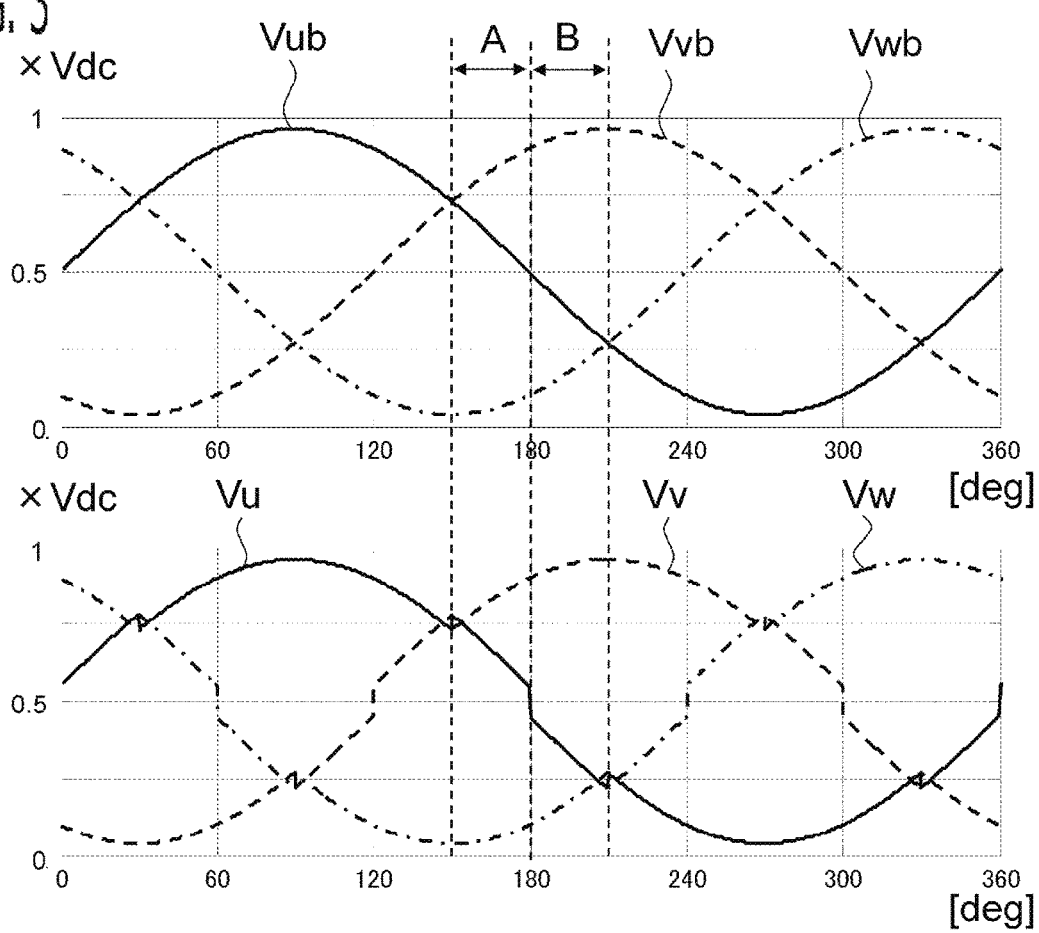

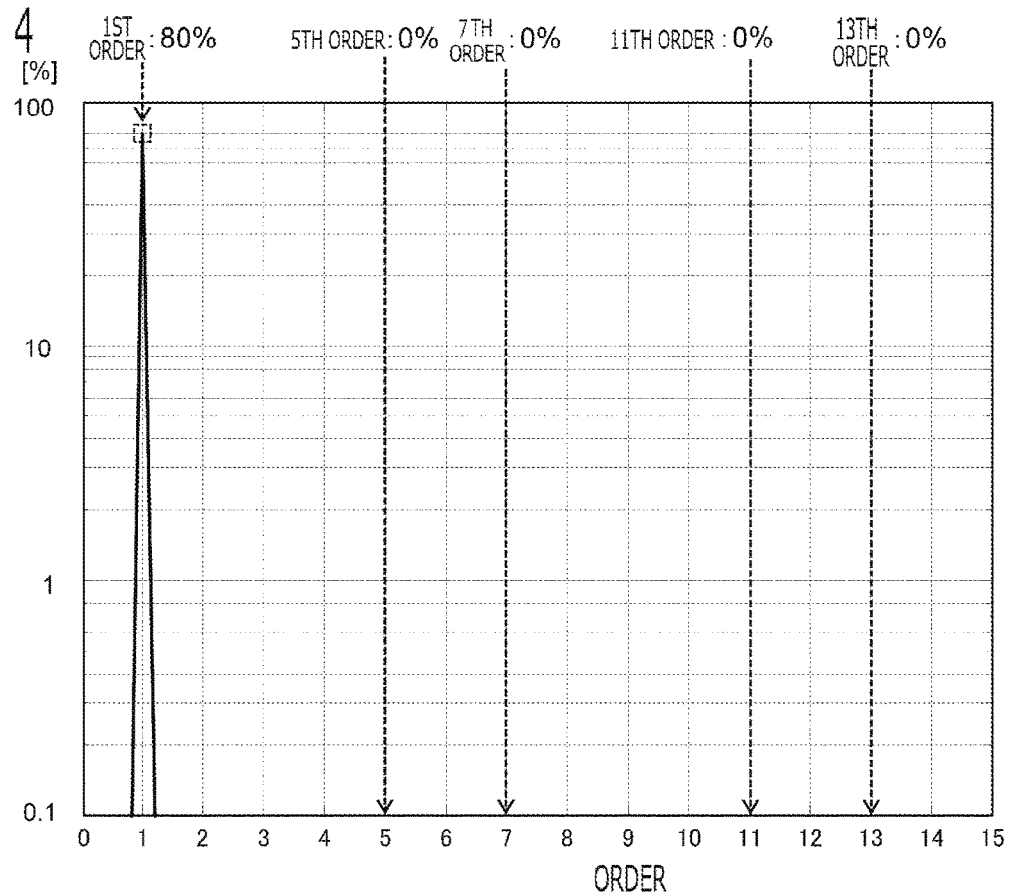

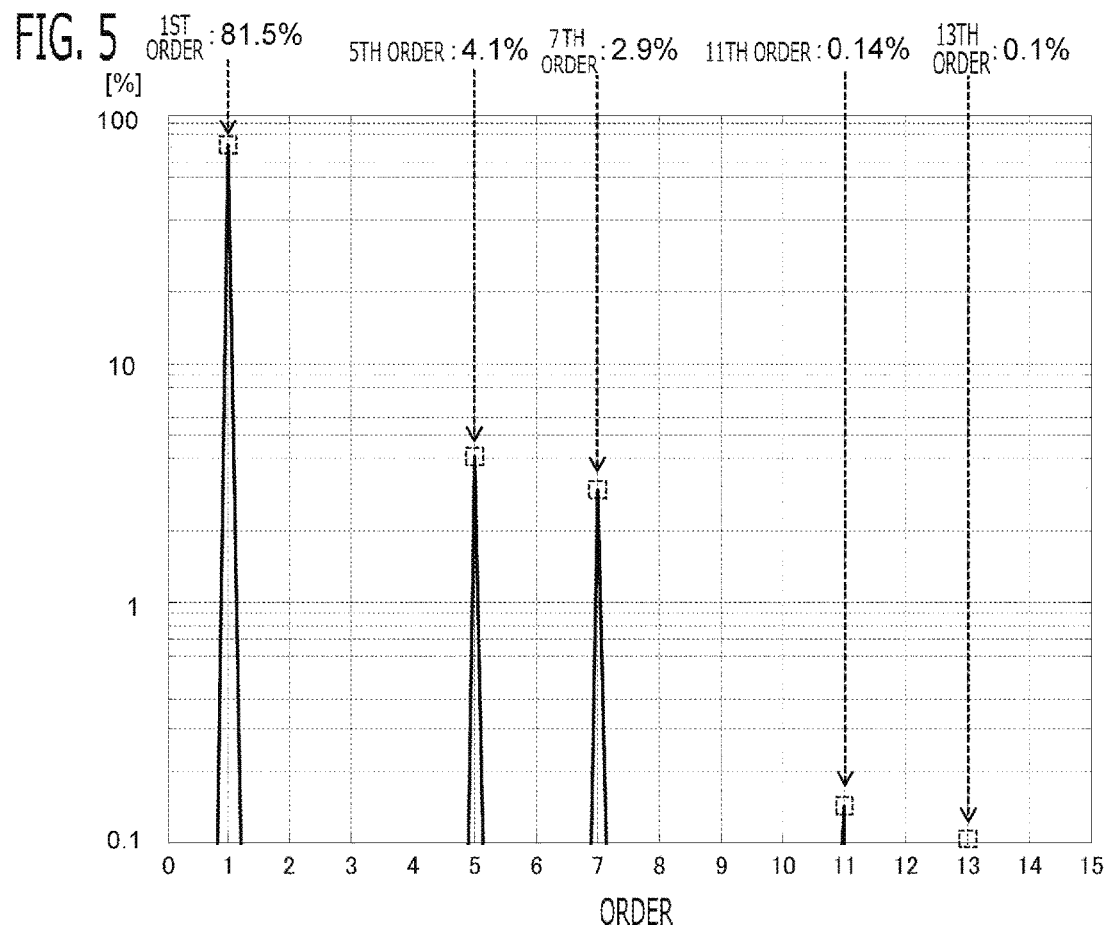
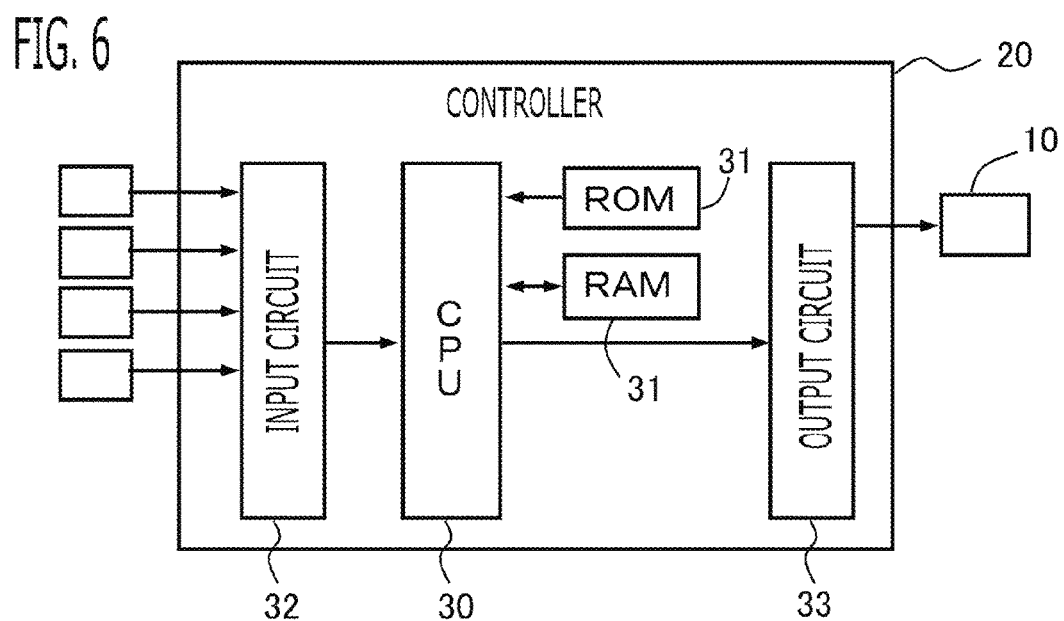

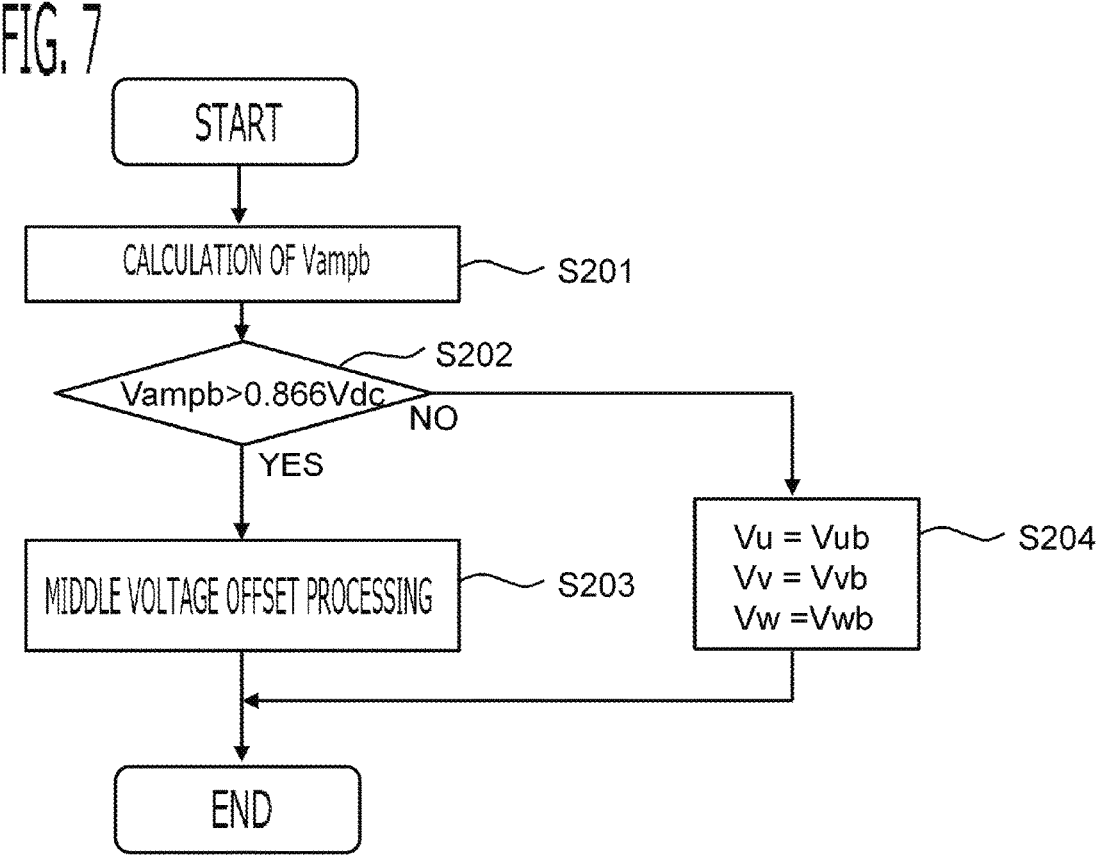

AC ROTARY MACHINE CONTROL DEVICE AND ELECTRIC POWER STEERING DEVICE

CROSS REFERENCE TO RELATED APPLICATIONS

This application is a National Stage of International Application No. PCT/JP2015/078928 filed Oct. 13, 2015, the contents of all of which are incorporated herein by reference in their entirety.

TECHNICAL FIELD

The present invention relates to an AC rotary machine control device, and an electric power steering device provided with the same.

BACKGROUND ART

With regard to the AC rotary machine control device as described above, an electric rotating machine disclosed in PLT 1 is known. In the technology of PLT 1, the content of the 5th order harmonic wave included in the AC rotary machine is detected, and the 5th order harmonic wave voltage command is calculated based on the detected harmonic wave content and output voltage, and the inverter is controlled based on the output voltage command on which the 5th order harmonic wave voltage command superimposed.

CITATION LIST

Patent Literature

PTL 1:JP-A-2012-135100

SUMMARY OF INVENTION

Technical Problem

However, since the AC voltage applied to the AC rotary machine becomes frequency proportional to the rotational frequency, the 5th order and the 7th order harmonic voltage components superimposed on the AC voltage become very high frequency, when the AC rotary machine rotates at high speed. In the technology of PLT 1, it is configured to calculate the 5th order harmonic wave voltage command by the equations (9) to (11) in PLT 1, and calculate the 7th order harmonic wave voltage command by the equations (12) to (14) in PLT 1. However, when the AC rotary machine rotates at high speed, since the frequency of the high order voltage commands calculated by those equations becomes high, if a cheap computing processing unit (CPU, DPS, and the like) with slow calculation processing speed is used, due to long calculation cycle and long dead time resulting from long calculation cycle, high order voltages cannot be accurately applied to the AC rotary machine, and high order voltage commands cannot be calculated due to lack of calculation processing speed. Therefore, in the technology of PLT 1, the expensive computing processing unit with fast calculation processing speed needed to be used, and there was a possibility of causing a cost hike.

Thus, there is desired an AC rotary machine control device which can superimpose the 5th order and the 7th order harmonic voltages on the AC voltage applied to the AC rotary machine by calculation processing of low processing load, and an electric power steering device provided with the same.

Solution to Problem

An AC rotary machine control device according to the present invention including:

an inverter that applies voltage to three phase windings which an AC rotary machine has, and a controller that controls the inverter, wherein m (m is a natural number) sets of the three phase windings and the inverters are provided for the one AC rotary machine, wherein the controller is provided with a voltage command calculation unit that, for each set of the m sets, calculates three phase voltage commands which are voltage commands to respective phases of the three phase windings; and an inverter control unit that, for each set, controls on/off of a plurality of switching devices which the inverter has, based on a DC voltage supplied to the inverter and the three phase voltage commands, wherein the voltage command calculation unit is provided with a basic command calculation unit that, for each set, calculates three phase basic voltage commands which are basic values of the three phase voltage commands; and a voltage command correction unit that calculates final three phase voltage commands by correcting the three phase basic voltage commands, and wherein the voltage command correction unit, for each set, determines a basic voltage command of a phase which becomes a middle voltage among the three phase basic voltage commands, as a middle voltage command; and performs middle voltage offset processing that adds an offset value, which is set to a positive value, to the middle voltage command, when the middle voltage command is larger than vibration center voltage, and subtracts the offset value from the middle voltage command, when the middle voltage command is smaller than the vibration center voltage.

An electric power steering device according to the present invention including:

the AC rotary machine control device described above, the AC rotary machine, and a driving force transmission mechanism that transmits a driving force of the AC rotary machine to a steering device of a vehicle.

Advantage of Invention

According to the AC rotary machine control device of the present invention, by simple calculation processing which adds or subtracts the offset value to the middle voltage command according to whether the middle voltage command in the three phase basic voltage commands is larger or smaller than the vibration center voltage, the 5th order and the 7th order harmonic voltages can be superimposed on the AC voltage applied to the AC rotary machine. Therefore, the calculation processing load at the high speed rotation range of the AC rotary machine where calculation processing load becomes high can be reduced, and cost reduction of the control device can be achieved using a cheap computing processing unit with slow calculation processing speed.

According the electric power steering device of the present invention, as mentioned above, since a cheap computing

BRIEF DESCRIPTION OF THE DRAWINGS

FIG. 3 is a time chart for explaining middle voltage offset processing according to Embodiment 1 of the present invention;

FIG. 4 is a figure showing frequency analysis result of interphase voltages of the three phase basic voltage commands of FIG. 3 according to Embodiment 1 of the present invention;

FIG. 5 is a figure showing frequency analysis result of interphase voltages of the three phase voltage commands after middle voltage offset processing of FIG. 3 according to Embodiment 1 of the present invention;

FIG. 6 is a hardware configuration diagram of the controller according to Embodiments 1 to 5 of the present invention;

FIG. 7 is a flowchart for explaining processing of a voltage command correction unit according to Embodiment 2 of the present invention;

DESCRIPTION OF EMBODIMENTS

1. Embodiment 1

Figure 1:
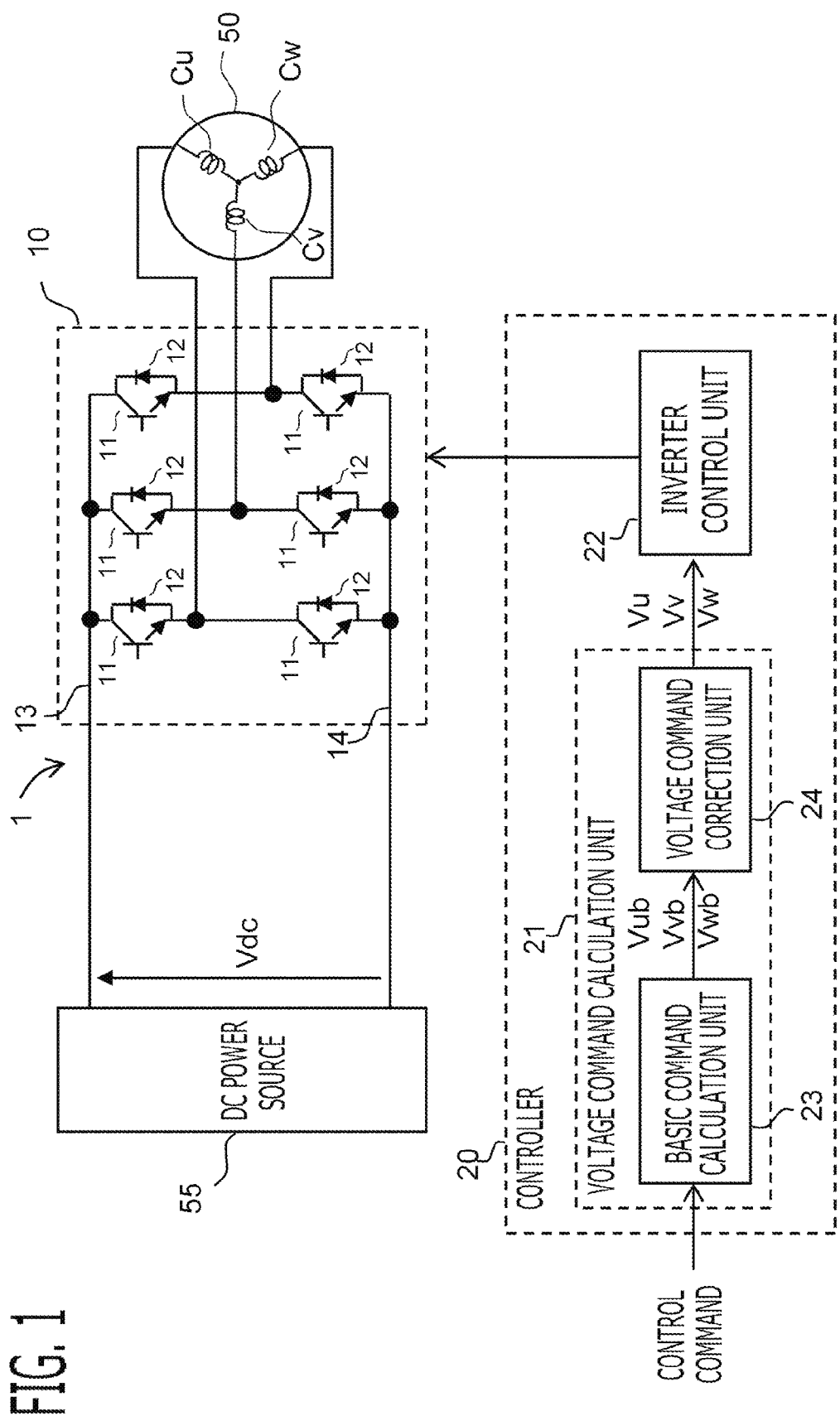
FIG. 1 is a schematic configuration diagram of an AC rotary machine control device according to Embodiments 1 to 3 of the present invention.

An AC rotary machine control device 1 (hereinafter, referred to simply as the control device 1) according to Embodiment 1 will be explained with reference to the drawings. The control device 1 is provided with an inverter 10 which applies voltage to three phase windings Cu, Cv, Cw which an AC rotary machine 50 has, and a controller 20 which controls the inverter 10. In the present embodiment, one set of the three phase windings Cu, Cv, Cw and the inverter 10 is provided for the one AC rotary machine 50. FIG. 1 is a circuit configuration diagram of the inverter 10, and a schematic block diagram of the controller 20 according to the present embodiment.

The AC rotary machine 50 is provided with a stator fixed to a nonrotation member, and a rotor which is disposed at the radial-direction inner side of the stator and is pivotably supported by a nonrotation member. In the present embodiment, the AC rotary machine 50 is a rotary machine of the permanent magnet synchronous type, the stator is provided with three phase windings Cu, Cv, Cw, and the rotor is provided with permanent magnets. The AC rotary machine 50 is electrically connected to a DC power source 55 via an inverter 10 which performs a DC/AC conversion. The AC rotary machine 50 has the function of an electric motor which receives electric power supply from the DC power source 55 and generates power.

The inverter 10 is a DC/AC conversion device that performs electric power conversion between the DC power source 55 and the AC rotary machine 50. The direct current power supplied from the DC power sources 55, such as an electricity accumulation device, is converted into the three phase alternating current power, and is supplied to the three phase windings Cu, Cv, Cw of the AC rotary machine 50. As the DC power source 55, the electricity accumulation device, such as a lead battery or a lithium ion battery, a DC-DC converter, a diode rectifier, a PWM rectifier, or the like is used.

The inverter 10 is provided with a plurality of switching devices 11. As the switching element, a bipolar transistor or an IGBT (Insulated Gate Bipolar Transistor) in which free wheel diode 12 is connected in reversely parallel, a power MOSFET (Metal Oxide Semiconductor Field Effect Transistor), or the like is used. The inverter 10 is configured into a bridge circuit in which three lines of a series circuit, where the two switching devices 11 were connected in series between the positive electrode side wire 13 and the negative electrode side wire 14, are connected in parallel corresponding to the windings Cu, Cv, Cw of each phase of three phases (U phase, V phase, W phase). That is to say, the inverter 10 is a three phase inverter provided with the six switching devices 11. An intermediate connection wire which connects the two switching devices 11 in each series circuit is connected to the winding of the corresponding phase, respectively. The three phase windings Cu, Cv, Cw are connected by a star connection. It may be connected by a delta connection.

The controller 20 is a controller that controls the AC rotary machine 50 by controlling the inverter 10. The controller 20 is provided with a voltage command calculation unit 21, an inverter control unit 22, and the like. The voltage command calculation unit 21 calculates three phase voltage commands Vu, Vv, Vw which are voltage commands to each phase of the three phase windings (winding of each phase). The inverter control unit 22 controls on/off of a plurality of switching devices 11 of the inverter 10, based on a DC voltage Vdc supplied to the inverter 10 and the three phase voltage commands Vu, Vv, Vw. The DC voltage Vdc is a voltage between the positive electrode side wire 13 and the negative electrode side wire 14.

The respective functions of the voltage command calculation unit 21, the inverter control unit 22, and the like included in the controller 20 are realized by processing circuits included in the controller 20. Specifically, as shown in FIG. 6, the controller 20 is provided, as the processing circuits, with a computing processing unit (computer) 30 such as a CPU (Central Processing Unit) and a DSP (Digital Signal Processor), storage apparatuses 91 that exchange data with the computing processing unit 30, an input circuit 32 that inputs external signals to the computing processing unit 30, an output circuit 33 that outputs signals from the computing processing unit 30 to the outside, and the like.

As the storage apparatuses 31, there are provided a RAM (Random Access Memory) which can read data and write data from the computing processing unit 30, a ROM (Read Only Memory) which can read data from the computing processing unit 30, and the like. The input circuit 32 is connected with various kinds of sensors and switches and is provided with an A/D converter and the like for inputting output signals from the sensors and the switches to the computing processing unit 30. The output circuit 33 is provided with a driving circuit and the like that output control signals from the computing processing unit 30 to electric loads such as the switching devices 11 and the like. The input circuit 32 is connected with a voltage sensor (unillustrated) which detects the DC voltage Vdc, a current sensor (unillustrated) which detects an actual current of the AC rotary machine 50, a rotation speed sensor (unillustrated) which detects a rotational speed of the AC rotary machine 50, and the like.

Then, the computing processing unit 30 runs software items (programs) stored in the storage apparatus 31 such as a ROM and collaborates with other hardware devices in the controller 20, such as the storage apparatus 31, the input circuit 32, and the output circuit 33, so that the respective functions of the voltage command calculation unit 21 and the inverter control unit 22 included in the controller 20 are realized. Each function of the controller 20 will be described in detail below.

The voltage command calculation unit 21 is provided with a basic command calculation unit 23 that calculates three phase basic voltage commands Vub, Vvb, Vwb which are basic values of three phase voltage commands, and a voltage command correction unit 24 that calculates final three phase voltage commands Vu, Vv, Vw by correcting the three phase basic voltage commands Vub, Vvb, Vwb calculated by the basic command calculation unit 23.

Known technology, such as V/f control and current feedback control, is used for the calculation method of the three phase basic voltage commands Vub, Vvb, Vwb in the basic command calculation unit 23. The V/f control sets a speed (frequency) command of the AC rotary machine 50 as a control command, and determines an amplitude of the three phase basic voltage commands Vub, Vvb, Vwb which oscillate at a frequency of the speed (frequency) command, depending on the speed (frequency) command. The current feedback control sets a current command of the AC rotary machine 50 as a control command, and changes the three phase basic voltage commands Vub, Vvb, Vwb so that an actual current of the AC rotary machine 50 approaches the current command using the vector control method. In detail, in a dq-axis (two-phase) rotating coordinate system that rotates in synchronization with rotation of the magnetic pole position of the permanent magnet of the AC rotary machine 50, the current feedback control calculates dq-axis voltage commands by proportional and integral control and the like based on a deviation between the current command and the actual current, and calculates the three phase basic voltage commands Vub, Vvb, Vwb by performing a fixed coordinate conversion and a two-phase/three phase conversion to the dq-axis voltage commands. In the dq-axis rotating coordinate system, d axis is defined in a magnetic pole direction (a direction of the N pole) of the permanent magnet, and q axis is defined in a direction advanced to d axis by 90 degrees in the electrical angle.

As shown in the equation (1) and the upper row of FIG. 3, the basic three phase basic voltage commands Vub, Vvb, Vwb become a cosine wave (or sine wave) which has an amplitude D centering on a vibration center voltage set to 0.5×the DC voltage Vdc, and oscillates with the rotational frequency of the magnetic pole position; and the phase of each phase of the three phase basic voltage commands is shifted by every 120 degrees in the rotational angle (electrical angle) of the magnetic pole position.

$$Vub = D \times \cos(\theta) + 0.5 \times Vdc$$

$$Vvb = D \times \cos(\theta - \Pi/3) + 0.5 \times Vdc$$

$$Vwb = D \times \cos(\theta + 2\Pi/3) + 0.5 \times Vdc \quad (1)$$

The voltage command correction unit 24 determines a basic voltage command of the phase which becomes a middle voltage among the three phase basic voltage commands Vub, Vvb, Vwb, as a middle voltage command Vmid; and performs a middle voltage offset processing that adds an offset value Voffset, which is set to a positive value, to the middle voltage command Vmid, when the middle voltage command Vmid is larger than the vibration center voltage, and subtracts the offset value Voffset from the middle voltage command Vmid, when the middle voltage command Vmid is smaller than the vibration center voltage. The voltage command correction unit 24 does not correct a maximum voltage command which is a basic voltage command of the phase which becomes a maximum voltage among the three phase basic voltage commands Vub, Vvb, Vwb, and a minimum voltage command which is a basic voltage command of the phase which becomes a minimum voltage, but sets the maximum voltage and the minimum voltage as final voltage commands directly.

Here, the vibration center voltage is a center voltage of the three phase basic voltage commands Vub, Vvb, Vwb which are oscillating, and is set to 0.5×the DC voltage Vdc in the present embodiment. The vibration center voltage may be set to 0.

The inverter control unit 22 performs PWM (Pulse Width Modulation) control that changes a duty ratio of a rectangular pulse wave signal which turns on or turns off the switching device 11 of each phase by comparing a carrier with each phase of the three phase voltage commands Vu, Vv, Vw calculated by the voltage command calculation unit 21 (the voltage command correction unit 24). The carrier is a triangular wave and the like which has an amplitude of 0.5×the DC voltage Vdc centering on the vibration center voltage set to 0.5×the DC voltage Vdc, and oscillates with a frequency higher than the rotational frequency of the magnetic pole position.

Figure 2:
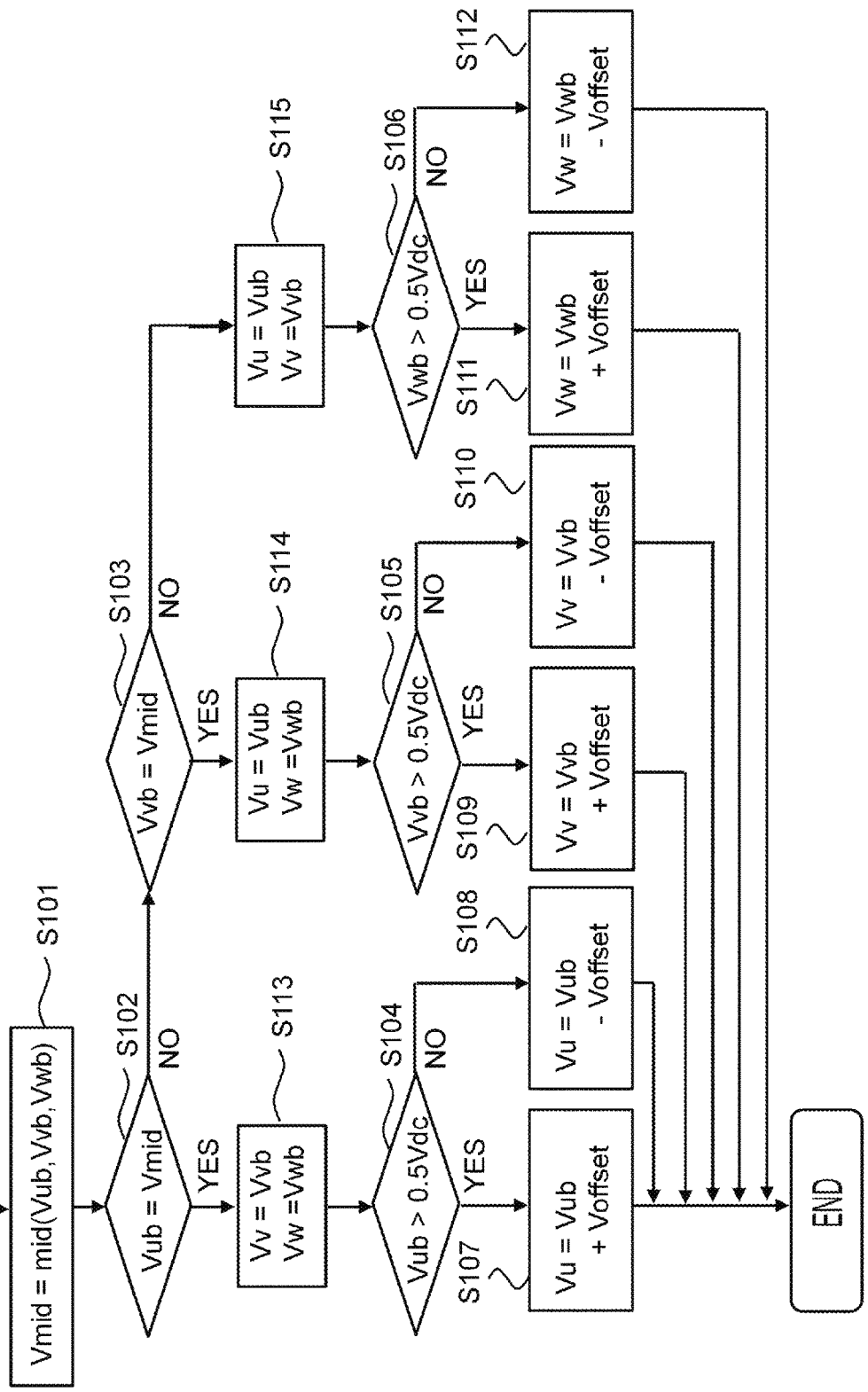
FIG. 2 is a flowchart for explaining processing of a voltage command correction unit according to Embodiment 1 of the present invention.

In the present embodiment, the middle voltage offset processing of the voltage command correction unit 24 is configured, as shown in the flowchart of FIG. 2. In the step S101, the voltage command correction unit 24 sets the basic voltage command of the phase which becomes the middle voltage among the three phase basic voltage commands Vub, Vvb, Vwb, as the middle voltage command Vmid. Specifically, the voltage command correction unit 24 sets the basic voltage command Vub of U phase as the middle voltage command Vmid, when the basic voltage command Vub of U phase is the middle voltage; sets the basic voltage command Vvb of V phase as the middle voltage command Vmid, when the basic voltage command Vvb of V phase is the middle voltage; and sets the basic voltage command Vwb of W phase as the middle voltage command Vmid, when the basic voltage command Vwb of W phase is the middle voltage.

In the step S102, the voltage command correction unit 24 determines whether or not the basic voltage command Vub of U phase coincides with the middle voltage command Vmid; advances to the step S113 in the case of determining that it coincides, and advances to the step S103 in the case of determining that it does not coincide. In the step S113, the voltage command correction unit 24 sets the basic voltage commands Vvb, Vwb of V phase and W phase other than U phase, as the final voltage commands Vv, Vw of V phase and W phase directly, respectively. In the step S104, the voltage command correction unit 24 determines whether or not the basic voltage command Vub of U phase determined as the middle voltage command Vmid is larger than the vibration center voltage (in this example, 0.5×Vdc); advances to the step S107 in the case of determining that it is larger, and advances to the step S108 in the case of determining that it is not larger. In the step S107, the voltage command correction unit 24 sets a value obtained by adding an offset value Voffset, which is set to a positive value, to the basic voltage command Vub of U phase, as the final voltage command Vu of U phase. On the other hand, in the step S108, the voltage command correction unit 24 sets a value obtained by subtracting the offset value Voffset, which is set to the positive value, from the basic voltage command Vub of U phase, as the final voltage command Vu of U phase; then ends the middle voltage offset processing.

On the other hand, in the step S103, the voltage command correction unit 24 determines whether or not the basic voltage command Vvb of V phase coincides with the middle voltage command Vmid; advances to step S114 in the case of determining that it coincides, and advances to step S115 in the case of determining that it does not coincide. In the step S114, the voltage command correction unit 24 sets the basic voltage commands Vub, Vwb of U phase and W phase other than V phase, as the final voltage commands Vu, Vw of U phase and W phase directly, respectively. In the step S105, the voltage command correction unit 24 determines whether or not the basic voltage command Vvb of V phase determined as the middle voltage command Vmid is larger than the vibration center voltage (in this example, 0.5×Vdc); advances to the step S109 in the case of determining that it is larger, and advances to the step S110 in the case of determining that it is not larger. In the step S109, the voltage command correction unit 24 sets a value obtained by adding the offset value Voffset, which is set to the positive value, to the basic voltage command Vvb of V phase, as the final voltage command Vv of V phase. On the other hand, in the step S110, the voltage command correction unit 24 sets a value obtained by subtracting the offset value Voffset, which is set to the positive value, from the basic voltage command Vvb of V phase, as the final voltage command Vv of V phase; then ends the middle voltage offset processing.

On the other hand, in the case of determining that the middle voltage command Vmid coincides with neither the basic voltage command Vub of U phase, nor the basic voltage command Vvb of V phase in the step S102 and the step S103, the voltage command correction unit 24 advances to the step S115 as if the basic voltage command Vwb of W phase coincides with the middle voltage command Vmid. In the step S115, the voltage command correction unit 24 sets the basic voltage commands Vub, Vvb of U phase and V phase other than W phase, as the final voltage commands Vu, Vv of U phase and V phase directly, respectively. In the step S106, the voltage command correction unit 24 determines whether or not the basic voltage command Vwb of W phase determined as the middle voltage command Vmid is larger than the vibration center voltage (in this example, 0.5×Vdc);

advances to the step S111 in the case of determining that it is larger, and advances to the step S112 in the case of determining that it is not larger. In the step S111, the voltage command correction unit 24 sets a value obtained by adding the offset value Voffset, which is set to the positive value, to the basic voltage command Vwb of W phase, as the final voltage command Vw of W phase. On the other hand, in the step S112, the voltage command correction unit 24 sets a value obtained by subtracting the offset value Voffset, which is set to the positive value, from the basic voltage command Vwb of W phase, as the final voltage command Vw of W phase; then ends the middle voltage offset processing.

Next, the behavior of the middle voltage offset processing will be explained using the time chart of FIG. 3. The time chart of the upper row of FIG. 3 shows the waveform of the three phase basic voltage commands Vub, Vvb, Vwb, and the time chart of the lower row shows the waveform of the three phase voltage commands Vu, Vv, Vw after the middle voltage offset processing. The vertical axis is expressed by the magnification with respect to the direct current voltage Vdc. The lower limit voltage of the voltage, which the inverter 10 can apply to the three phase windings Cu, Cv, Cw of the AC rotary machine 50, is 0, and the upper limit voltage is Vdc. When the three phase voltage commands Vu, Vv, Vw deviate from the range of 0 to Vdc, the voltage applied to the three phase windings Cu, Cv, Cw is lower-limited to 0, or upper-limited to Vdc, and the voltage saturation causes. The horizontal axis shows the rotational angle (electrical angle) of the magnetic pole position.

In the interval A and the interval B, the basic voltage command Vub of U phase becomes the middle voltage command Vmid. In the interval A, since the basic voltage command Vub of U phase is larger than the vibration center voltage (0.5×Vdc), the value obtained by adding the offset value Voffset to the basic voltage command Vub of U phase is set to the final voltage command Vu of U phase. In the interval B, since the basic voltage command Vub of U phase is smaller than the vibration center voltage (0.5×Vdc), the value obtained by subtracting the offset value Voffset from the basic voltage command Vub of U phase is set as the final voltage command Vu of U phase. The offset value Voffset is set to a value of 10% of the DC voltage Vdc. On the other hand, in the intervals A and B, the basic voltage commands Vvb, Vwb of V phase and W phase other than U phase is set to the final voltage command Vv, Vw of V phase and W phase directly, respectively.

FIG. 4 shows a frequency analysis result of interphase voltages of the three phase basic voltage commands Vub, Vvb, Vwb shown in the time chart of the upper row of FIG. 3. Respective interphase voltages (line voltages) of the three phase basic voltage commands are Vuvb=Vub−Vvb, Vvwb=Vvb−Vwb, and Vwub=Vwb−Vub. Since respective interphase voltages Vuvb, Vvwb, Vwub of the three phase basic voltage commands are the same waveforms with different phases, the frequency analysis result of any one of the interphase voltages is shown (the following frequency analysis results are also the same). The vertical axis of FIG. 4 shows the frequency analysis result of the interphase voltages by the percentage to the direct current voltage Vdc (the frequency analysis result/Vdc×100%). The fundamental wave (1st order of rotational frequency of the magnetic pole position) component of the interphase voltages of the three phase basic voltage commands is 80%, and other order components are less than 0.1%.

FIG. 5 shows a frequency analysis result of the interphase voltages of the three phase voltage commands Vu, Vv, Vw after the middle voltage offset processing shown in the time chart of the lower row of FIG. 3. Respective interphase voltages of the three phase voltage commands are Vuv=Vu−Vv, Vvw=Vv−Vw, and Vwu=Vw−Vu. Since respective interphase voltages Vuv, Vvw, Vwu of the three phase voltage commands are the same waveforms with different phases, the frequency analysis result of any one of the interphase voltages is shown (the following frequency analysis results are also the same). The vertical axis of FIG. 5 shows the frequency analysis result of the interphase voltages by the percentage to the direct current voltage Vdc like FIG. 4. The fundamental wave (1st order of rotational frequency of magnetic pole position) component of the interphase voltages of the three phase voltage commands is 81.5%, the 5th order harmonic wave component is 4.1%, the 7th order harmonic wave component is 2.9%, and the 11th order harmonic wave component is the maximum 0.14% among other order harmonic wave components. Compared with the case of FIG. 4, by the middle voltage offset processing, with generating the 5th order harmonic wave component and the 7th order harmonic wave component, and without generating other order harmonic wave components almost, the fundamental wave component can be increased.

In the present embodiment, the voltage command correction unit 24 changes the offset value Voffset according to an amplitude value Vampb of the interphase voltages of the three phase basic voltage commands. For example, the voltage command correction unit 24 enlarges the offset value Voffset as the amplitude value Vampb of the interphase voltages of the three phase basic voltage commands becomes large. By use of a data table in which the relationship between the amplitude value Vampb of the interphase voltages of the three phase basic voltage commands, and the offset value Voffset is preliminarily set, the voltage command correction unit 24 calculates the offset value Voffset corresponding to the calculated amplitude value Vampb of the interphase voltages of the three phase basic voltage commands. As shown in the equation (2), the voltage command correction unit 24 calculates a square root value of a value obtained by multiplying 2 to a value added square values of respective phases of the three phase basic voltage commands Vub, Vvb, Vwb, as the amplitude value Vampb of the interphase voltages of the three phase basic voltage commands. A data table in which the relationship between an input value and a square root value of the input value is preliminarily set may be used for the calculation of the square root value.

$$\text{Vampb}=\sqrt{(2\times(\text{Vub}^2+\text{Vvb}^2+\text{Vwb}^2))} \tag{2}$$

As described above, according to the configuration of Embodiment 1, by simple calculation processing which adds or subtracts the offset value Voffset to the middle voltage command according to whether the middle voltage command in the three phase basic voltage commands is larger or smaller than the vibration center voltage, the 5th order harmonic voltage and the 7th order harmonic voltage can be generated, and the fundamental wave voltage can be increased. Therefore, since the complicated calculation processing which calculates the 5th order harmonic voltage and the 7th order harmonic voltage like the PLT 1 is unnecessary, the calculation processing load in the high speed rotation range of the AC rotary machine where calculation processing load becomes high can be reduced, and a cheap computing processing unit with slow calculation processing speed can be used.

2. Embodiment 2

Next, the control device 1 according to Embodiment 2 will be explained. The explanation for constituent parts the same as those in Embodiment 1 will be omitted. In the present embodiment, as is the case with Embodiment 1, one set of the three phase windings Cu, Cv, Cw and the inverter 10 is provided for the one AC rotary machine 50. The circuit configuration diagram of the inverter 10 and the schematic block diagram of the controller 20 according to the present embodiment are the same as those in Embodiment 1 shown in FIG. 1.

In the present embodiment, unlike Embodiment 1, the voltage command correction unit 24 performs the middle voltage offset processing, when the amplitude value Vampb of the interphase voltages of the three phase basic voltage commands is larger than a determination amplitude value Jamp obtained by multiplying 0.866 (=√3/2) to the DC voltage Vdc as shown in the equation (3).

$$Jamp=0.866 \times Vdc \quad (3)$$

When the amplitude value Vampb of the interphase voltages of the three phase basic voltage commands becomes larger than 0.866×Vdc, the three phase basic voltage commands Vub, Vvb, Vwb deviate from the range of 0 to Vdc and oscillate, and voltage saturation causes.

On the other hand, when the amplitude value Vampb of the interphase voltages of the three phase basic voltage commands is below the determination amplitude value Jamp, the voltage command correction unit 24 sets the three phase basic voltage commands Vub, Vvb, Vwb to the final three phase voltage commands Vu, Vv, Vw directly without performing the middle voltage offset processing.

In the present embodiment, processing of the voltage command correction unit 24 is configured, as shown in the flowchart of FIG. 7. In the step S201, the voltage command correction unit 24 calculates the amplitude value Vampb of the interphase voltages of the three phase basic voltage commands. As is the case with Embodiment 1, as shown in the equation (2), the voltage command correction unit 24 calculates a square root value of a value obtained by multiplying 2 to a value added square values of respective phases of the three phase basic voltage commands Vub, Vvb, Vwb, as the amplitude value Vampb of the interphase voltages of the three phase basic voltage commands.

Next, in the step S202, the voltage command correction unit 24 determines whether or not the amplitude value Vampb of the interphase voltages of the three phase basic voltage commands is larger than the determination amplitude value Jamp (0.866×Vdc); then advances to the step S203 in the case of determining that it is larger, and advances to the step S204 in the case of determining that it is not larger. As the direct current voltage Vdc, a detection value by a voltage sensor may be used, or a preliminarily set value may be used when the DC voltage Vdc is a fixed value, In the step S203, the voltage command correction unit 24 performs the middle voltage offset processing, and ends processing. Since the middle voltage offset processing is the same as from the step S101 to the step S112 of the flowchart of FIG. 2 in Embodiment 1, its explanation is omitted.

On the other hand, in the step S204, the voltage command correction unit 24 sets the three phase basic voltage commands Vub, Vvb, Vwb to the final three phase voltage commands Vu, Vv, Vw directly, respectively, and ends processing.

Figure 8:
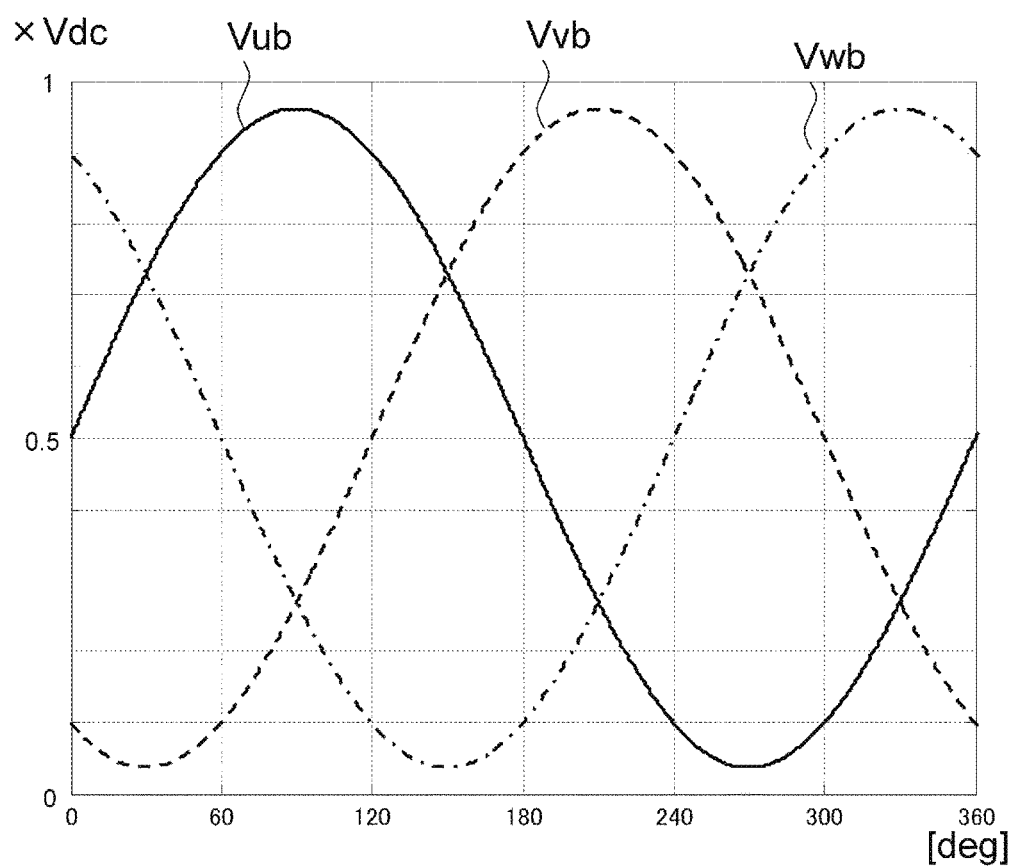
FIG. 8 is a time chart of three phase basic voltage commands when amplitude value is 80% of DC voltage according to Embodiment 2 of the present invention.
Figure 9:
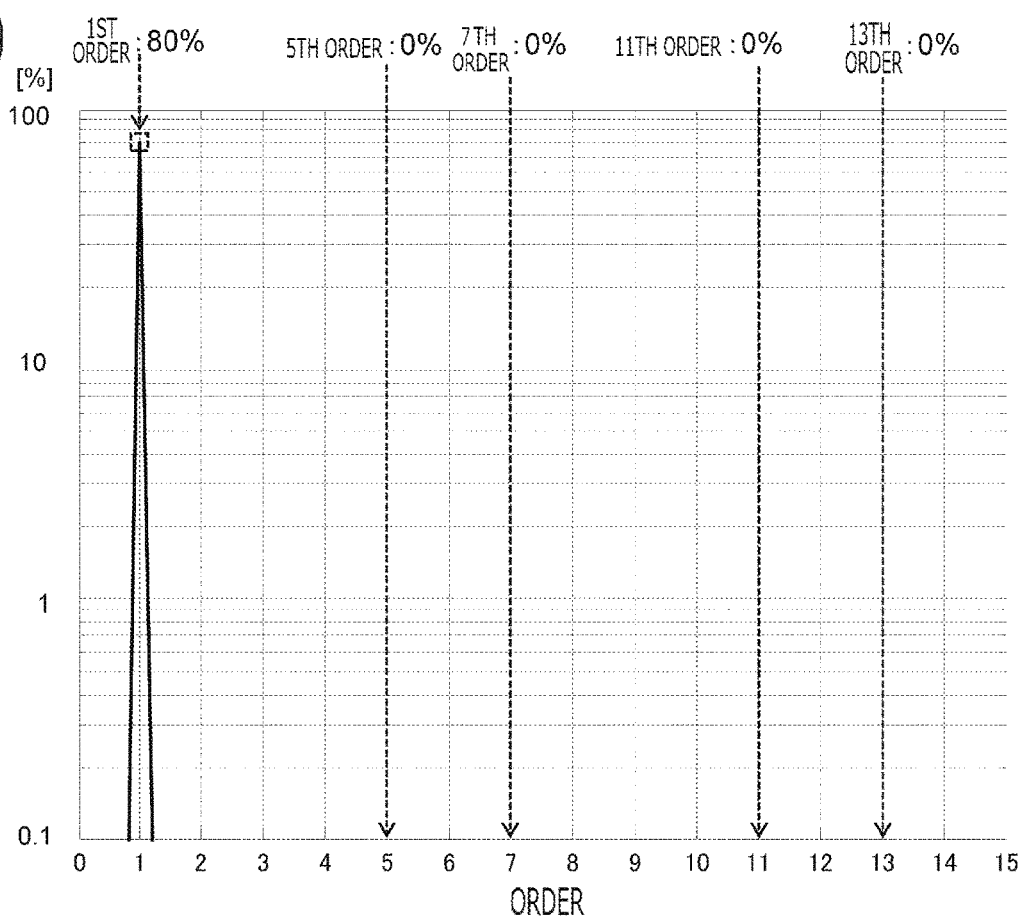
FIG. 9 is a figure showing frequency analysis result of interphase voltages of the three phase basic voltage commands of FIG. 8 according to Embodiment 2 of the present invention.

The effect of processing of the voltage command correction unit 24 according to the present embodiment is explained. FIG. 8 shows the waveforms of the three phase basic voltage commands Vub, Vvb, Vwb when the amplitude value Vampb of the interphase voltages of the three phase basic voltage commands is 80% of the DC voltage Vdc. In this case, the three phase basic voltage commands Vub, Vvb, Vwb are oscillating within the range of 0 to Vdc, and voltage saturation does not cause. Therefore, as FIG. 9 shows the frequency analysis result of the interphase voltages of the three phase basic voltage commands of FIG. 8, order components other than the fundamental wave (1st order) component do not cause.

Figure 10:
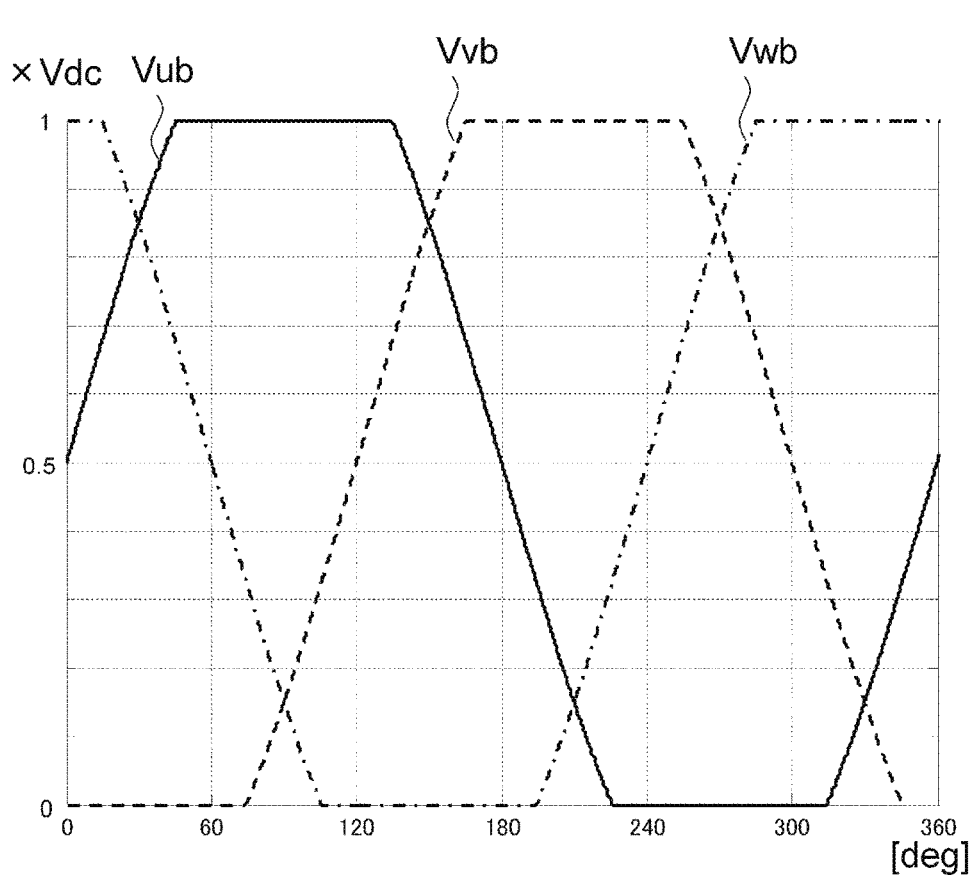
FIG. 10 is a time chart of three phase basic voltage commands when amplitude value is 100% of DC voltage according to Embodiment 2 of the present invention.
Figure 11:
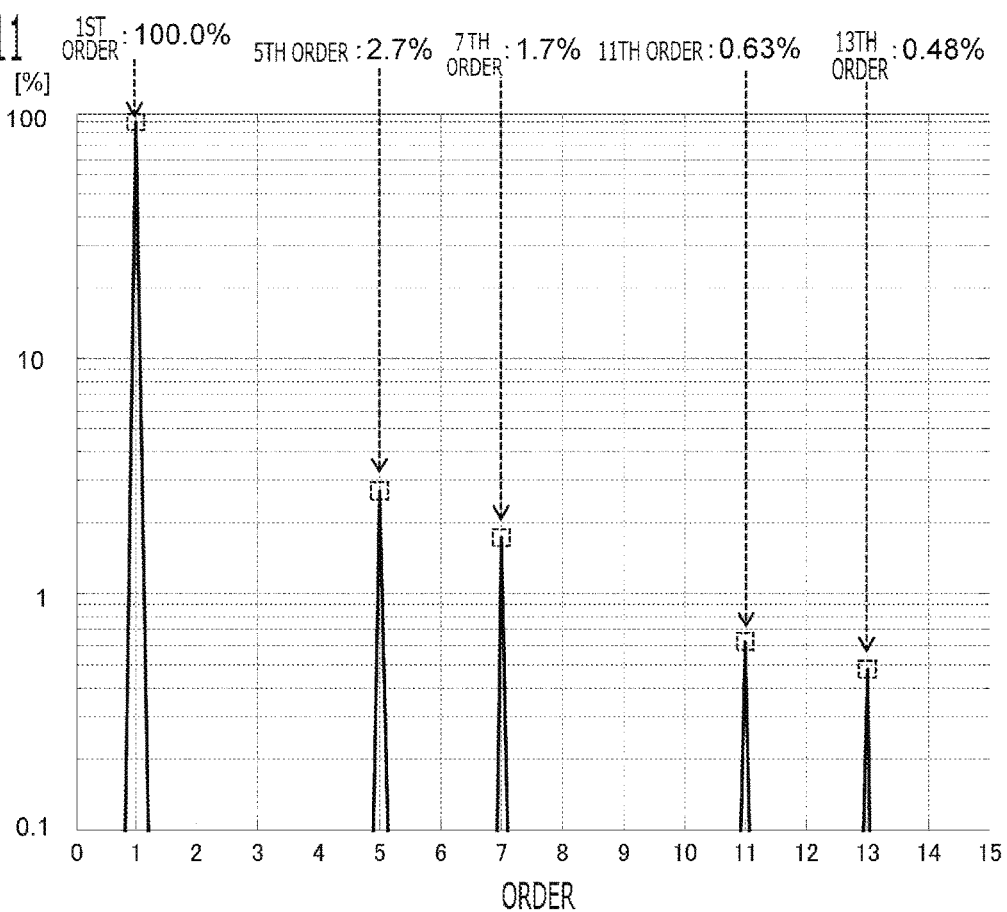
FIG. 11 is a figure showing frequency analysis result of interphase voltages of the three phase basic voltage commands of FIG. 10 according to Embodiment 2 of the present invention.

FIG. 10 shows the waveforms of the three phase basic voltage commands Vub, Vvb, Vwb when the amplitude value Vampb of the interphase voltages of the three phase basic voltage commands is 100% of the DC voltage Vdc. In this case, the three phase basic voltage commands Vub, Vvb, Vwb deviate from the range of 0 to Vdc, and oscillate, and voltage saturation causes in the interval in which deviation occurs. Therefore, the three phase basic voltage commands after performing lower limitation by 0 and upper limitation by the DC voltage Vdc to the three phase basic voltage commands Vub, Vvb, Vwb become voltage commands effective for control of the inverter 10. As FIG. 11 shows the frequency analysis result of the interphase voltages of the three phase basic voltage commands of FIG. 10 after the upper and lower limitation by 0 and the DC voltage Vdc, order components (the 5th order harmonic voltage, the 7th order harmonic voltage, the 11th order harmonic voltage, the 13th order harmonic voltage) other than the fundamental wave (1st order) component cause.

Figure 12:
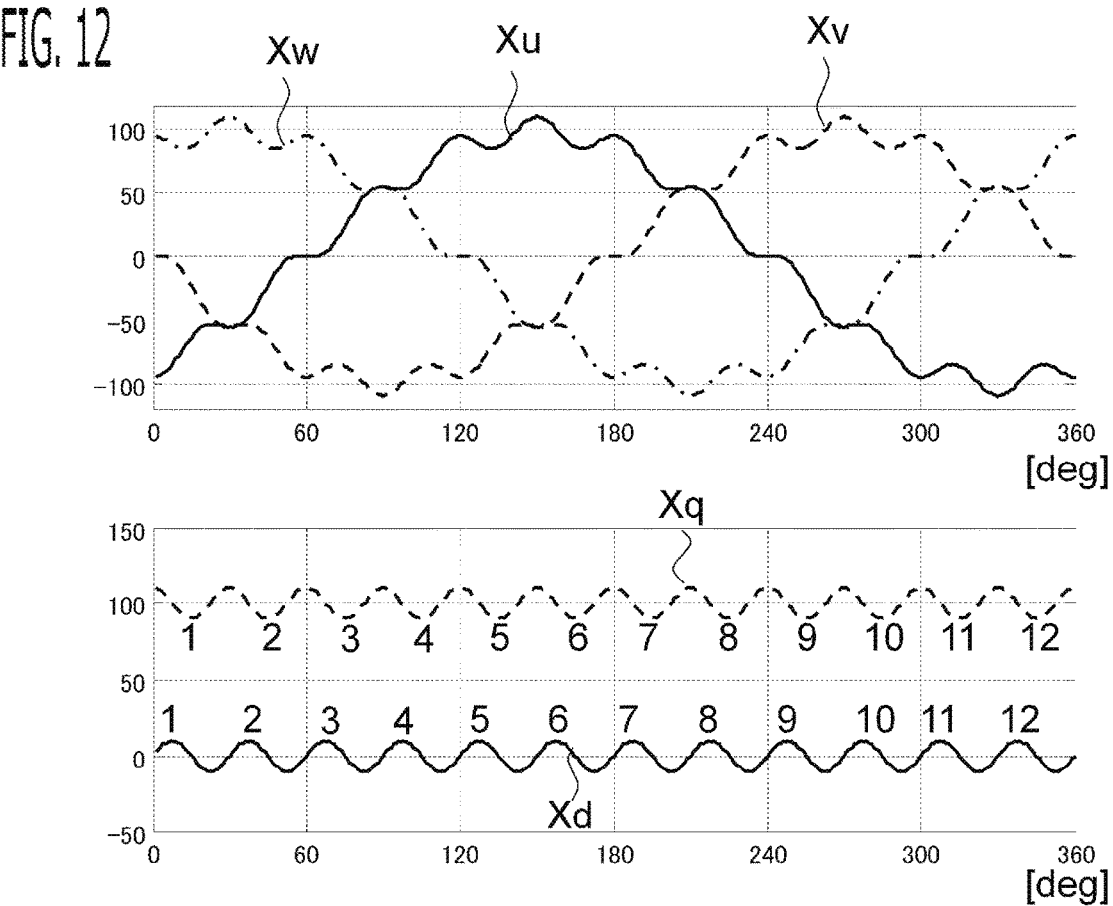
FIG. 12 is a time chart for explaining the 11th order harmonic wave component included in three phase AC physical values according to Embodiment 2 of the present invention.
Figure 13:
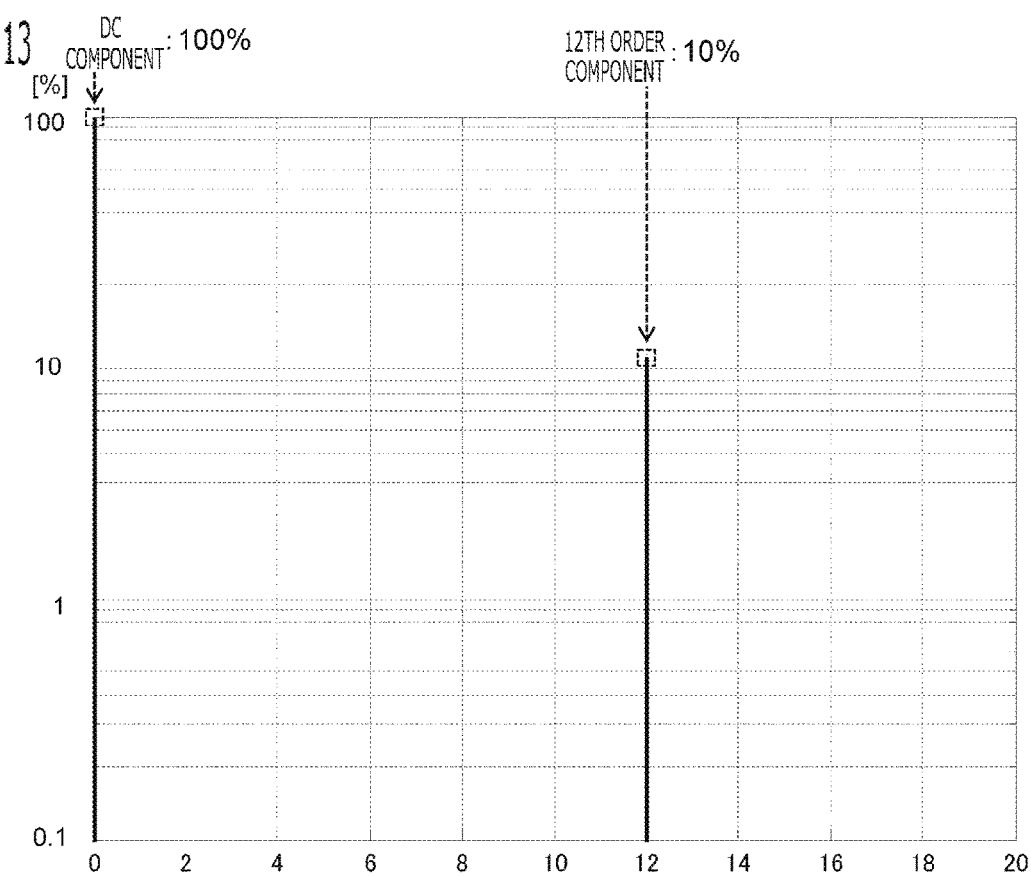
FIG. 13 is a figure showing frequency analysis result of the physical values in dq-axis rotating coordinate system of FIG. 12 according to Embodiment 2 of the present invention.

Here, the relationship between the harmonic wave components included in the three phase voltage commands and the harmonic wave components included in the voltage commands of the dq-axis rotating coordinate system is explained. The upper row of FIG. 12 shows the physical values Xu, Xv, Xw (voltage or current) of the symmetrical three phase AC obtained by adding the 11th order harmonic wave component, which has 10% amplitude of the amplitude of the fundamental wave, to the fundamental wave (1st order, 360 deg period); and the lower row of FIG. 12 shows the physical values Xd, Xq obtained by converting the physical values of the symmetrical three phase AC into the dq-axis rotating coordinate system. As shown in the lower row of FIG. 12, by including the 11th harmonic wave component in the physical values Xu, Xv, Xw of the symmetrical three phase AC, the 12th harmonic wave component, which has 12 peaks in the period (360 deg) of the fundamental wave, is generated in the physical values Xd, Xq converted into the dq-axis rotating coordinate system. Also in the frequency analysis result of the physical value Xq shown in FIG. 13, the 12th order harmonic wave component causes in addition to the DC component (zero order), and other order harmonic wave component does not cause.

Figure 14:
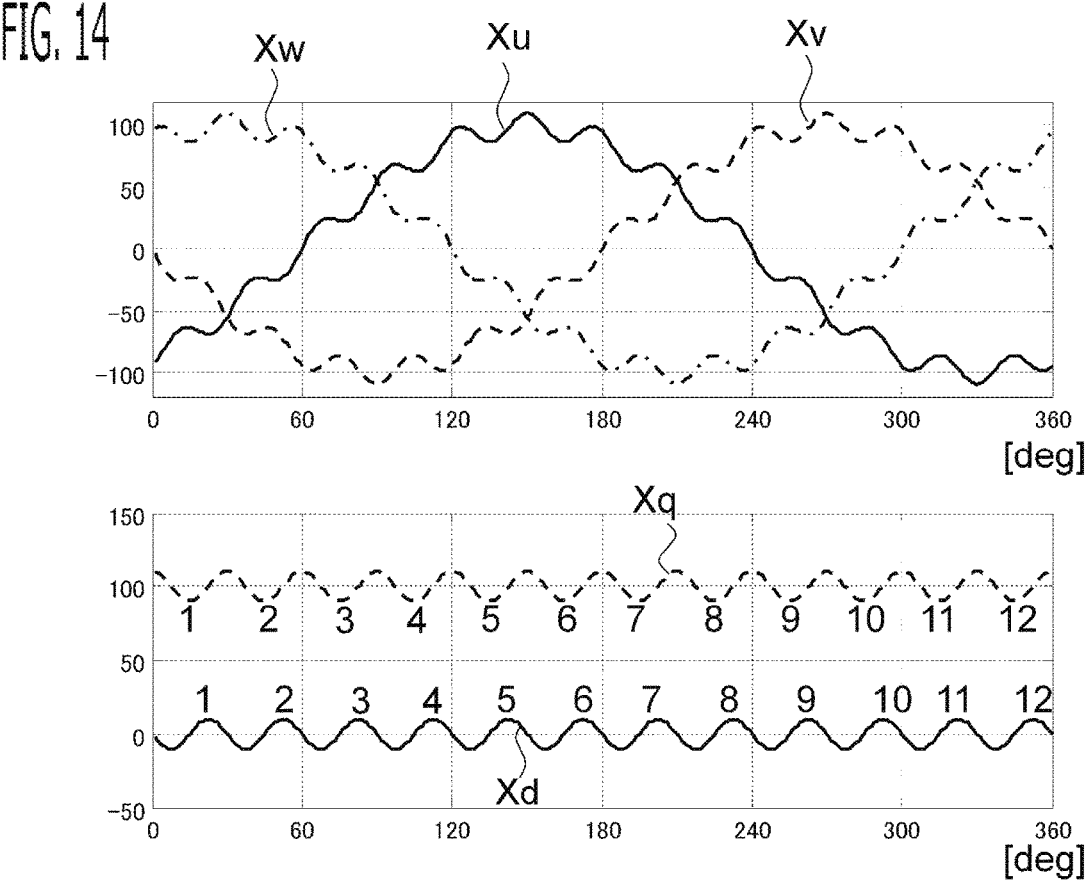
FIG. 14 is a time chart for explaining the 13th order harmonic wave component included in three phase AC physical values according to Embodiment 2 of the present invention.
Figure 15:
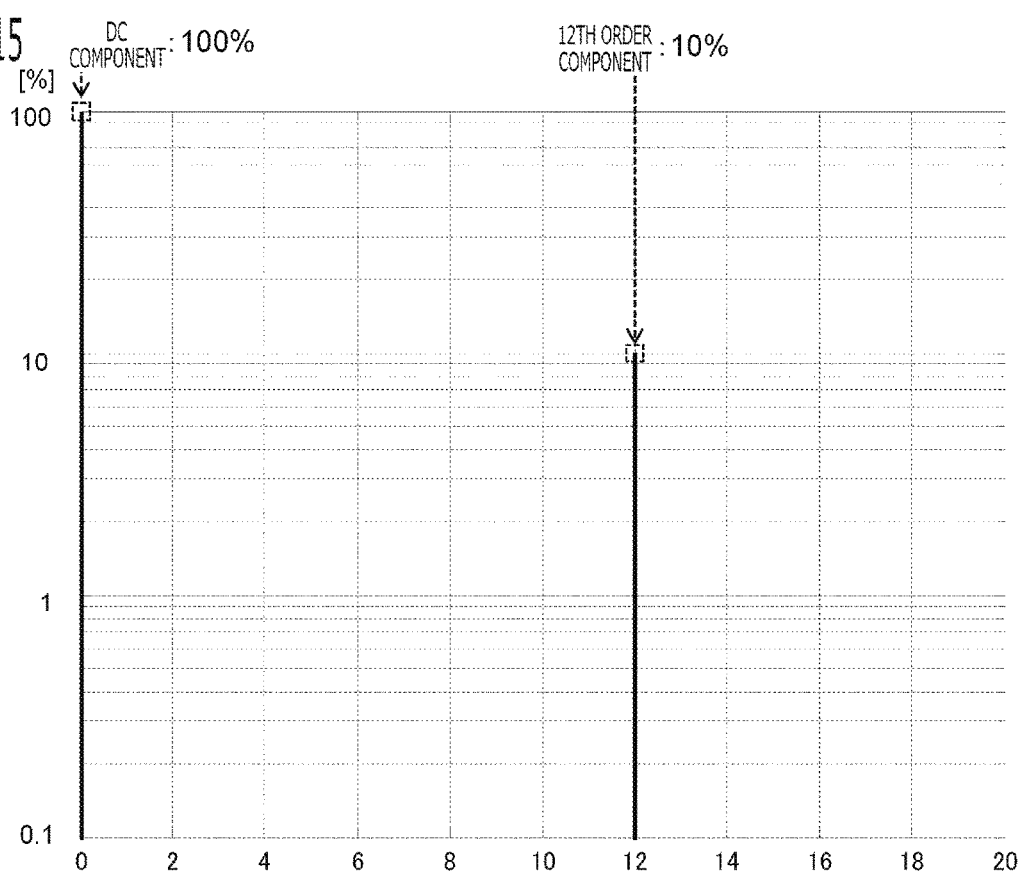
FIG. 15 is a figure showing frequency analysis result of the physical values in dq-axis rotating coordinate system of FIG. 14 according to Embodiment 2 of the present invention.

Similarly, the upper row of FIG. 14 shows the physical values Xu, Xv, Xw (voltage or current) of the symmetrical three phase AC obtained by adding the 13th order harmonic wave component, which has 10% amplitude of the amplitude of the fundamental wave, to the fundamental wave (1st order, 360 degrees period); and the lower row of FIG. 14 shows the physical values Xd, Xq obtained by converting the physical values of the symmetrical three phase AC into the dq-axis rotating coordinate system. As shown in the lower row of FIG. 14, by including the 13th harmonic wave component in the physical values Xu, Xv, Xw of the symmetrical three phase AC, the 12th harmonic wave component, which has 12 peaks in the period (360 degrees) of the fundamental wave, is generated in the physical values Xd, Xq converted into the dq-axis rotating coordinate system. Also in the frequency analysis result of the physical value Xq shown in FIG. 15, the 12th order harmonic wave component causes in addition to the DC component (zero order), and other order harmonic wave component does not cause.

Accordingly, when the 11th order or the 13th order harmonic wave component causes to the fundamental wave in the physical value of symmetrical three phase AC, the 12th order harmonic wave component is generated in the physical value converted into the dq-axis rotating coordinate system. The 11th order and the 13th order harmonic wave components shown in FIG. 11, which cause in the interphase voltages of the three phase basic voltage commands which voltage saturation occurs, becomes the 12th harmonic wave component in the dq-axis rotating coordinate system. Therefore, it may become the 12th order torque ripple, vibration, and noise in the AC rotary machine 50, and a problem may cause. In the example of the frequency analysis result of the interphase voltages of the three phase basic voltage commands which voltage saturation occurs (when the amplitude value Vampb is 100% of the DC voltage Vdc) shown in FIG. 11, the 11th order causes 0.63% and the 13th order causes 0.48%, when this three phase basic voltage commands is directly set to the three phase voltage commands Vu, Vv, Vw, there is a possibility that the 12th order torque ripple of the AC rotary machine 50 becomes large.

Figure 16:
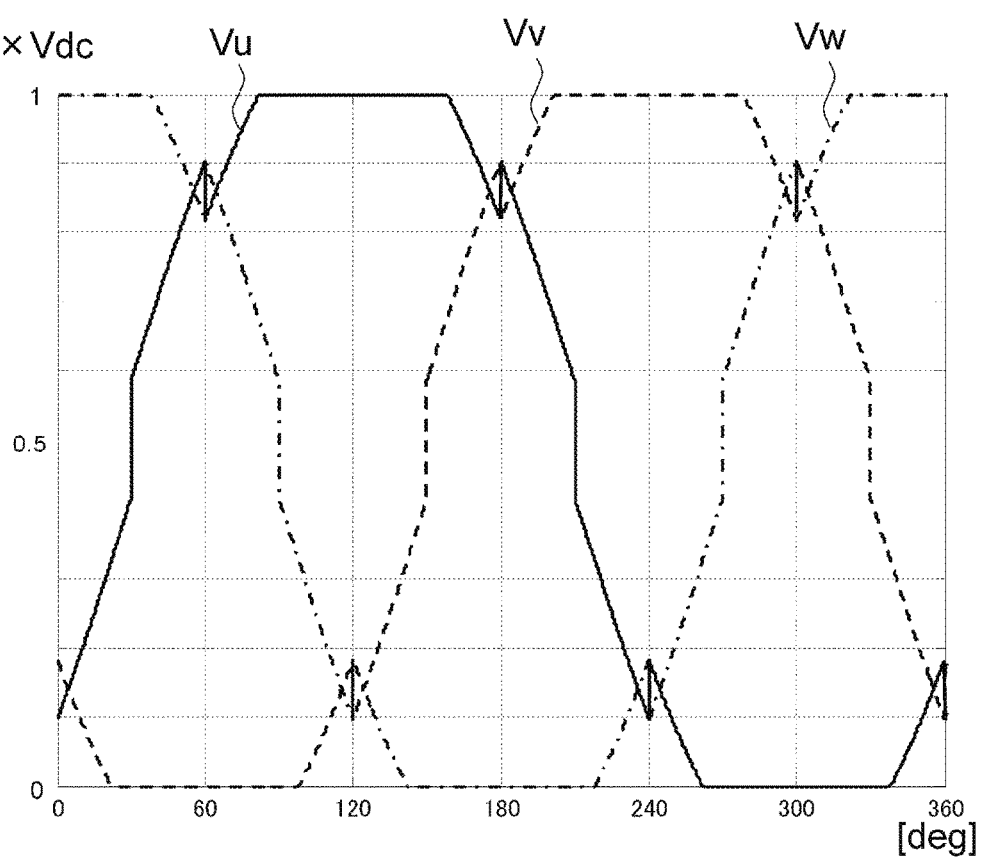
FIG. 16 is a time chart of three phase voltage commands after middle voltage offset processing to FIG. 10 according to Embodiment 2 of the present invention.

Accordingly, in the present embodiment, when voltage saturation occurs in the three phase basic voltage commands Vub, Vvb, Vwb, and the amplitude value Vampb of the interphase voltages of the three phase basic voltage commands becomes larger than 0.866×Vdc, it is configured to perform middle voltage offset processing. FIG. 16 shows the three phase voltage commands Vu, Vv, Vw after performing middle voltage offset processing to the three phase basic voltage commands Vub, Vvb, Vwb shown in FIG. 10 (when the amplitude value Vampb is 100% of the DC voltage Vdc). The offset value Voffset is set to 8.5% of the DC voltage Vdc.

Figure 17:
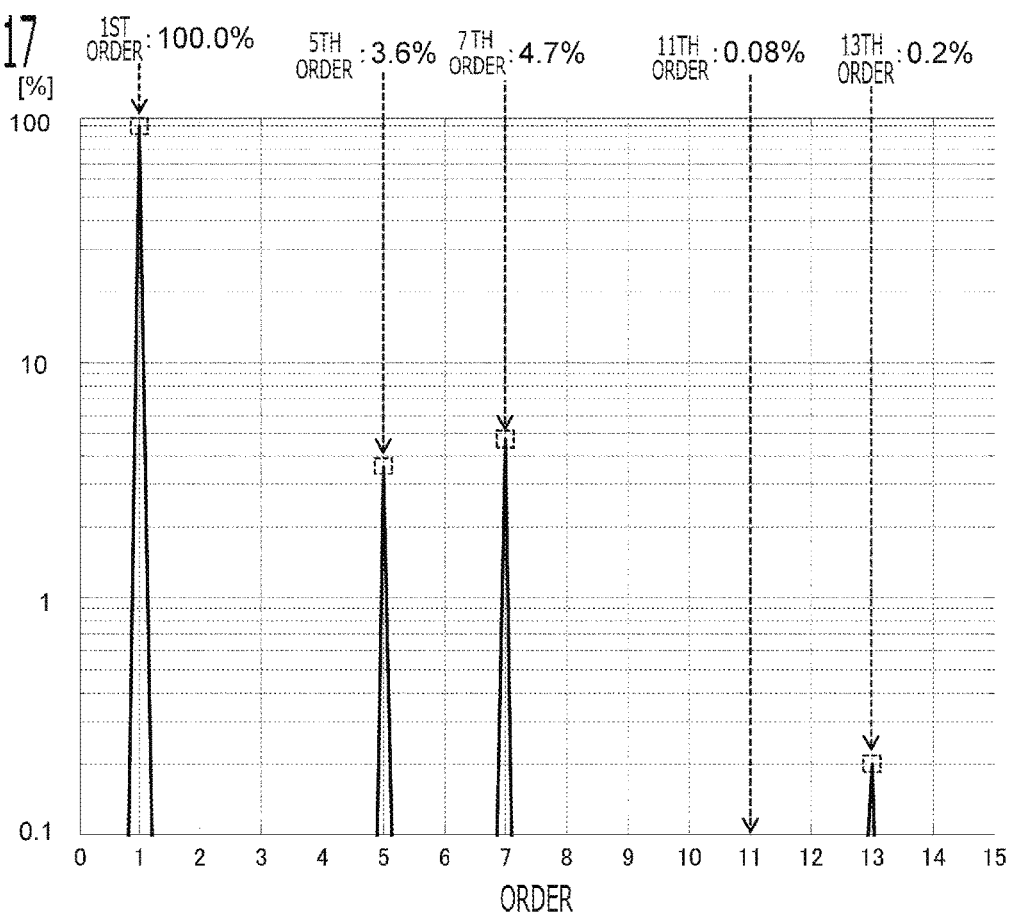
FIG. 17 is a figure showing frequency analysis result of interphase voltages of the three phase voltage commands of FIG. 16 according to Embodiment 2 of the present invention.

FIG. 17 shows the frequency analysis result of the interphase voltages of the three phase voltage commands Vu, Vv, Vw shown in FIG. 16. As shown in FIG. 17, the 11th order is 0.08% and the 13th order is 0.2%. Therefore, compared with the case where the 11th order is 0.63% and the 13th order is 0.48% in FIG. 11 before middle voltage offset processing, the 11th order and the 13th order components can be reduced significantly. Therefore, the 12th order torque ripple, vibration, and noise of the AC rotary machine 50 resulting from the 11th order and the 13th order components can be reduced.

3. Embodiment 3

Next, the control device 1 according to Embodiment 3 will be explained. The explanation for constituent parts the same as those in Embodiment 1 will be omitted. In the present embodiment, as is the case with Embodiment 1, one set of the three phase windings Cu, Cv, Cw and the inverter 10 is provided for the one AC rotary machine 50. The circuit configuration diagram of the inverter 10 and the schematic block diagram of the controller 20 according to the present embodiment are the same as those in Embodiment 1 shown in FIG. 1.

The basic command calculation unit 23 performs third order harmonic wave injection processing that add a third order harmonic wave V3f, which has three times frequency of the fundamental wave component of the three phase basic voltage commands, to each phase of the three phase basic voltage commands Vub, Vvb, Vwb. As shown in the equation (4), the basic command calculation unit 23 sets values obtained by adding the third order harmonic wave V3f to each phase of the three phase basic voltage commands Vub, Vvb, Vwb, as the final three phase basic voltage commands Vub*, Vvb*, Vwb*.

$$Vub^* = Vub + V3f$$

$$Vvb^* = Vvb + V3f$$

$$Vwb^* = Vwb + V3f \quad (4)$$

Since the third order harmonic waves V3f are canceled, the interphase voltages of the three phase basic voltage commands Vub*, Vvb*, Vwb* after third order harmonic wave injection processing become the same values as the interphase voltages of the three phase basic voltage commands Vub, Vvb, Vwb before third order harmonic wave injection processing. Therefore, the amplitude value Vampb of these interphase voltages also becomes the same values.

Although in the case of not performing third order harmonic wave injection processing, voltage saturation will occur when the amplitude value Vampb of the interphase voltages of the three phase basic voltage commands becomes larger than 0.866×Vdc as explained in Embodiment 2, by performing third order harmonic wave injection processing, voltage saturation does not occur until the amplitude value Vampb of the interphase voltages of the three phase basic voltage commands becomes larger than 1.0×Vdc.

In the present embodiment, the basic command calculation unit 23 calculates the third order harmonic wave V3f based on at least one of a maximum voltage command Vmax which is a basic voltage command of a phase which becomes a maximum voltage among the three phase basic voltage commands Vub, Vvb, Vwb, and a minimum voltage command Vmin which is a basic voltage command of a phase which becomes a minimum voltage among the three phase basic voltage commands Vub, Vvb, Vwb.

As shown in the equation (5), the basic command calculation unit 23 calculates a value obtained by multiplying −0.5 to an integrated value of the maximum voltage command Vmax and the minimum voltage command Vmin, as the third order harmonic wave V3f.

$$V3f = (Vmax + Vmin) \times (-0.5) \quad (5)$$

Figure 18:
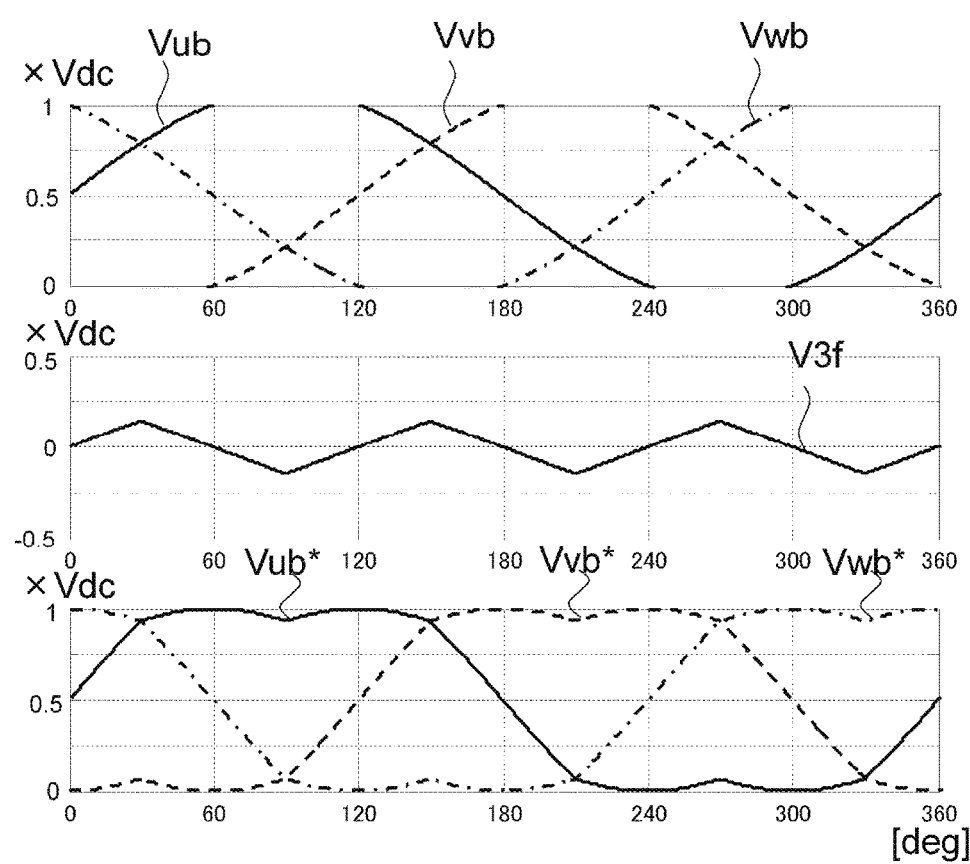
FIG. 18 is a time chart explaining third order harmonic wave injection processing when amplitude value is 100% of DC voltage according to Embodiment 3 of the present invention.

Hereinafter, the suppression effect of voltage saturation by third order harmonic wave injection processing will be explained in detail. The upper row of FIG. 18 shows the three phase basic voltage commands Vub, Vvb, Vwb before addition of the third order harmonic wave V3f (when the amplitude value Vampb is 100% of the DC voltage Vdc), the middle row shows the third order harmonic wave V3f, and the lower row shows the three phase basic voltage commands Vub*, Vvb*, Vwb* after addition of the third order harmonic wave V3f. Since the amplitude value Vampb is 100% of the DC voltage Vdc, voltage saturation occurs in the three phase basic voltage commands Vub, Vvb, Vwb of the upper row.

Figure 19:
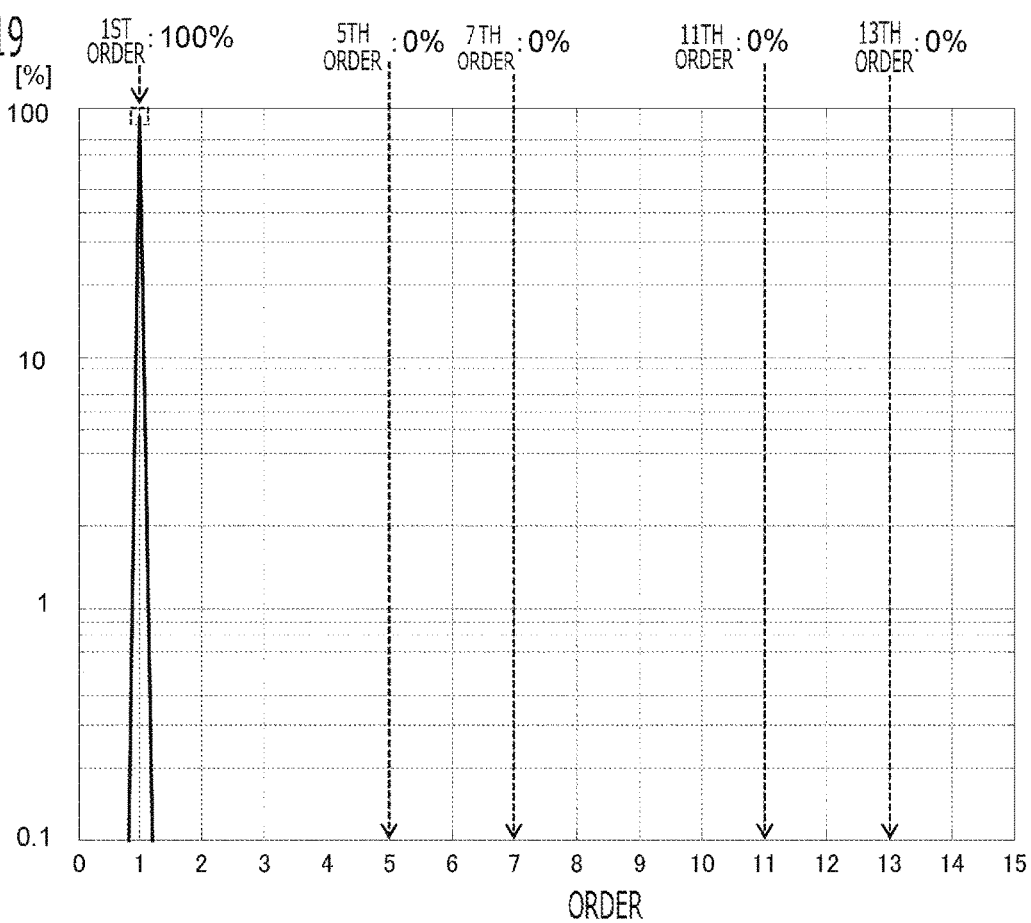
FIG. 19 is a figure showing frequency analysis result of interphase voltages of three phase basic voltage commands after third order harmonic wave injection processing of FIG. 18 according to Embodiment 3 of the present invention.

The third order harmonic wave V3f is a triangular wave having 3 times frequency of the frequency (1st order) of the fundamental wave component of the three phase basic voltage commands Vub, Vvb, Vwb (it has 3 peaks in the period (360 deg) of the fundamental wave). In the three phase basic voltage commands Vub*, Vvb*, Vwb* of the lower row, voltage saturation does not occur by addition of the third order harmonic wave V3f. Therefore, as FIG. 19 shows the frequency analysis result of the interphase voltages of the three phase basic voltage commands Vub*, Vvb*, Vwb* of the lower row of FIG. 18, any harmonic wave components other than the fundamental wave (1st order) component do not cause.

On the other hand, when the amplitude value Vampb of the interphase voltages of the three phase basic voltage commands is larger than 1.0×Vdc, even if third order harmonic wave injection processing is performed, voltage saturation cannot be reduced to zero. Accordingly, in the present embodiment, unlike Embodiment 1, the voltage command correction unit 24 performs middle voltage offset processing to the three phase basic voltage commands Vub*, Vvb*, Vwb* after third order harmonic wave injection processing, when the amplitude value Vampb of the interphase voltages of the three phase basic voltage commands is larger than the determination amplitude value Jamp obtained by multiplying 1.0 to the DC voltage Vdc.

Specifically, the voltage command correction unit 24 determines a basic voltage command of the phase which becomes a middle voltage among the three phase basic voltage commands Vub*, Vvb*, Vwb* after third order harmonic wave injection processing, as a middle voltage command Vmid; and performs a middle voltage offset processing that adds an offset value Voffset, which is set to a positive value, to the middle voltage command Vmid, when the middle voltage command Vmid is larger than the vibration center voltage (in this example, 0.5×Vdc), and subtracts the offset value Voffset from the middle voltage command Vmid, when the middle voltage command Vmid is smaller than the vibration center voltage (0.5×Vdc). The voltage command correction unit 24 does not correct a maximum voltage command which is a basic voltage command of the phase which becomes a maximum voltage among the three phase basic voltage commands Vub*, Vvb*, Vwb* after third order harmonic wave injection processing, and a minimum voltage command which is a basic voltage command of the phase which becomes a minimum voltage, but sets the maximum voltage and the minimum voltage as final voltage commands directly.

Figure 20:
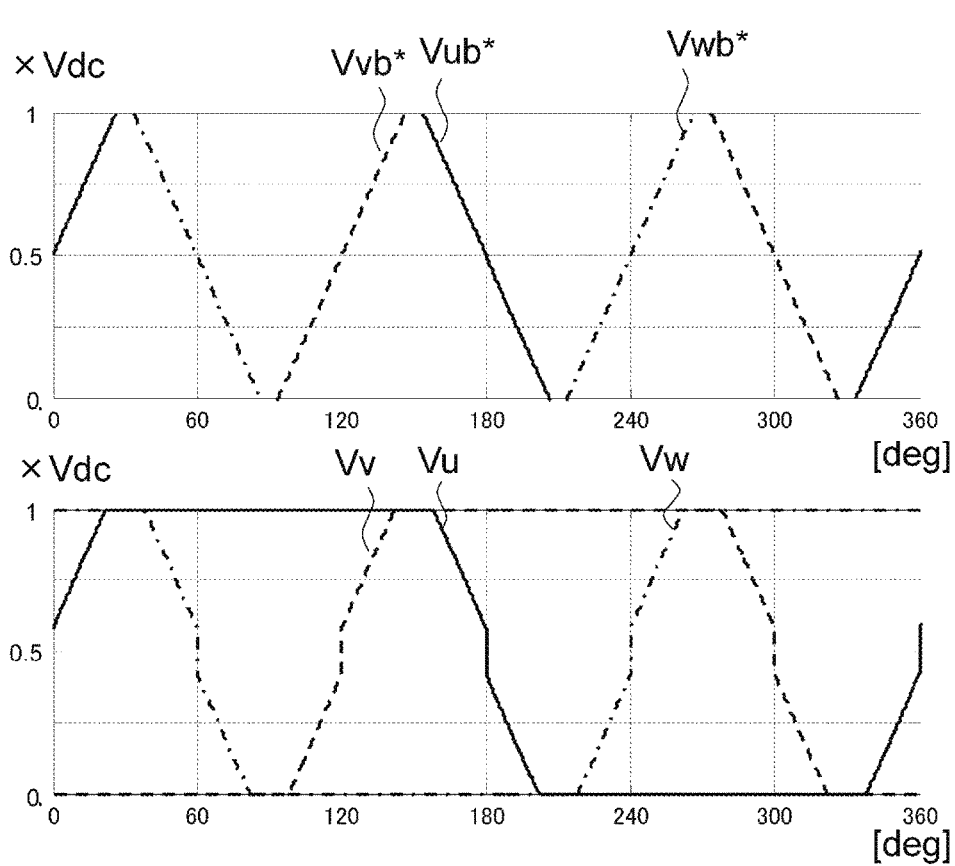
FIG. 20 is a time chart explaining middle voltage offset processing when amplitude value is 130% of DC voltage according to Embodiment 3 of the present invention.
Figure 21:
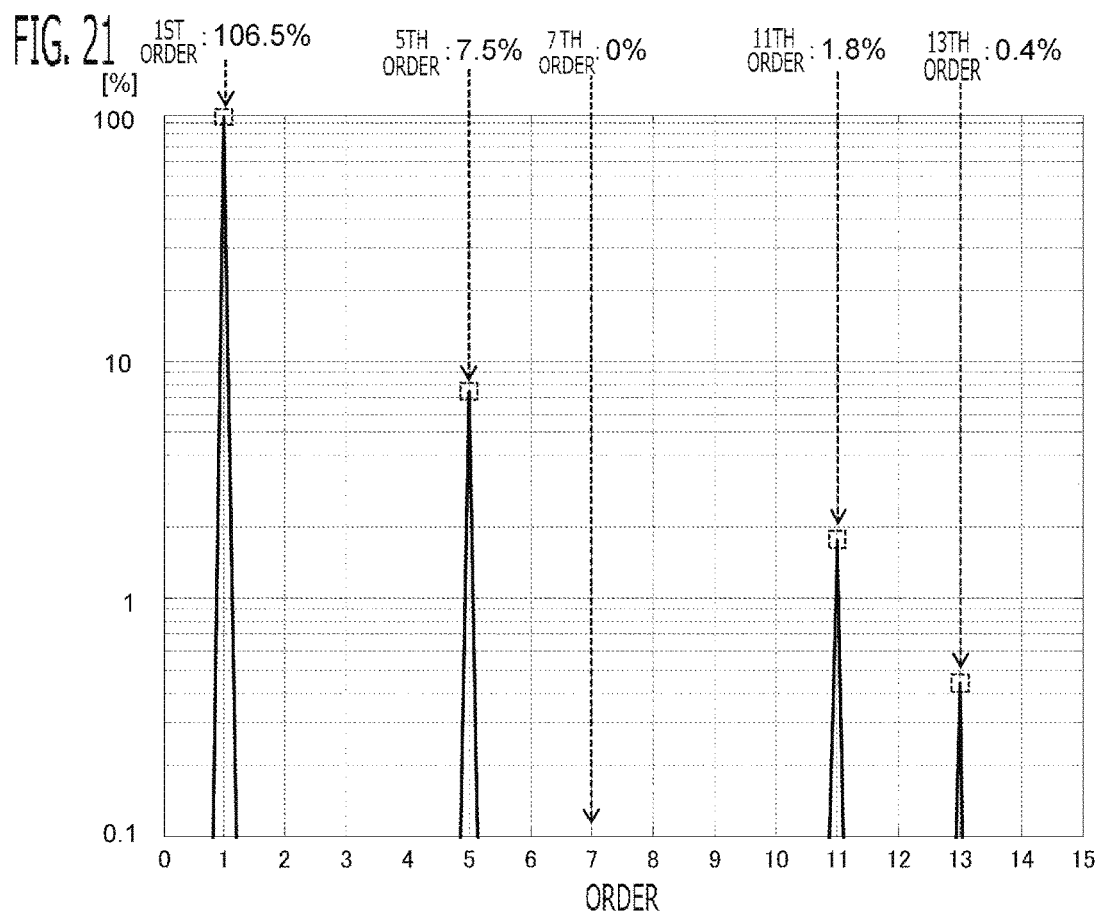
FIG. 21 is a figure showing frequency analysis result of interphase voltages of the three phase basic voltage commands of FIG. 20 according to Embodiment 3 of the present invention.

The upper row of FIG. 20 shows the three phase basic voltage commands Vub*, Vvb*, Vwb* after third order harmonic wave injection processing when the amplitude value Vampb of the interphase voltages of the three phase basic voltage commands is 130% of the DC voltage Vdc, and the lower row shows the three phase voltage commands Vu, Vv, Vw after middle voltage offset processing. The offset value Voffset of middle voltage offset processing is set to 8% of the DC voltage Vdc. As shown in the upper row of FIG. 20, since the amplitude value Vampb is 130% which is larger than 100% of the DC voltage Vdc, even if third order harmonic wave injection processing is performed, voltage saturation occurs. FIG. 21 shows the frequency analysis result of the interphase voltages of the three phase basic voltage commands of the upper row of FIG. 20 after the upper and lower limitation by 0 and the DC voltage Vdc. From the figure, the 11th order component causes 1.8% and the 13th order component causes 0.4%.

Figure 22:
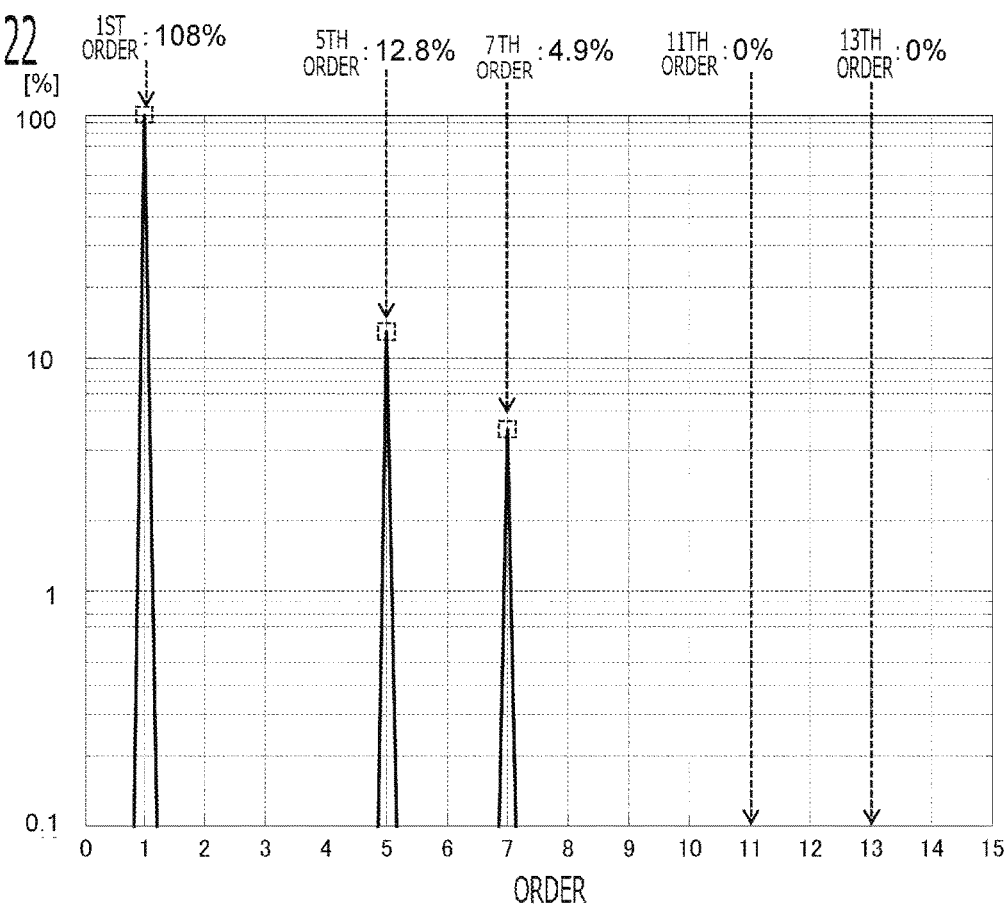
FIG. 22 is a figure showing frequency analysis result of interphase voltages of the three phase voltage commands after middle voltage offset processing of FIG. 20 according to Embodiment 3 of the present invention.

FIG. 22 shows the frequency analysis result of the interphase voltages of the three phase voltage commands of the lower row of FIG. 20 after the upper and lower limitation by 0 and the DC voltage Vdc. From the figure, the 11th order component and the 13th order component are reducing to less than 0.1% by middle voltage offset processing. Accordingly, by middle voltage offset processing, the 12th order torque ripple, vibration, and noise of the AC rotary machine 50 resulting from the 11th order and the 13th order components can be reduced.

Figure 23:
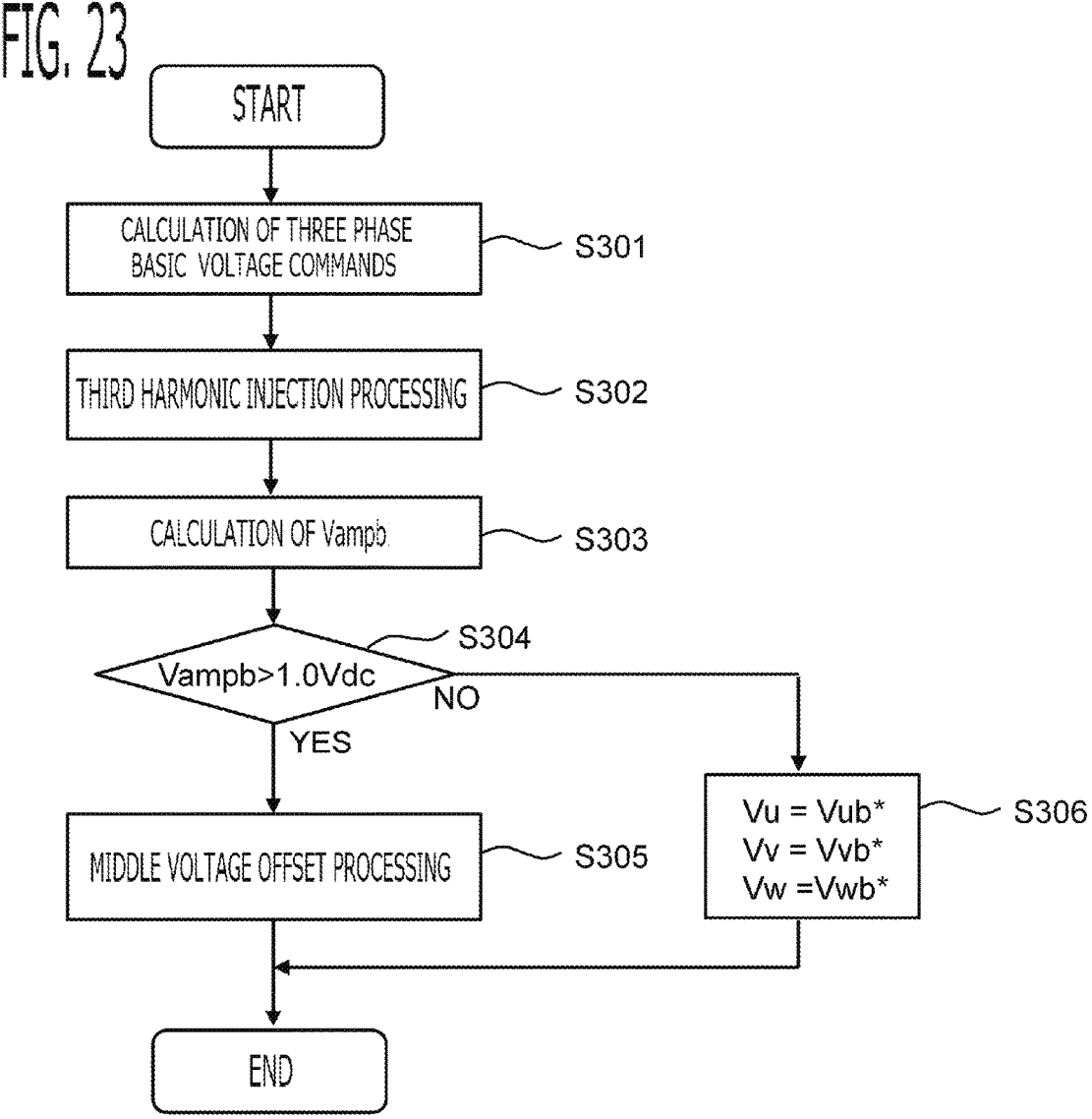
FIG. 23 is a flowchart explaining processing of a basic command calculation unit and a voltage command correction unit according to Embodiment 3 of the present invention.

In the present embodiment, processing of the basic command calculation unit 23 and the voltage command correction unit 24 is configured, as shown in the flowchart of FIG. 23. In the step S301, the basic command calculation unit 23 calculates the three phase basic voltage commands Vub, Vvb, Vwb. Then, in the step S302, the basic command calculation unit 23 performs third order harmonic wave injection processing to the three phase basic voltage commands Vub, Vvb, Vwb, and calculates the three phase basic voltage commands Vub*, Vvb*, Vwb* after third order harmonic wave injection processing. In the step S303, the voltage command correction unit 24 calculates the amplitude value Vampb of the interphase voltages of the three phase basic voltage commands. As is the case with Embodiment 1, as shown in the equation (2), the voltage command correction unit 24 calculates a square root value of a value obtained by multiplying 2 to a value added square values of respective phases of the three phase basic voltage commands Vub*, Vvb*, Vwb* after third order harmonic wave injection processing, as the amplitude value Vampb of the interphase voltages of the three phase basic voltage commands.

Next, in the step S304, the voltage command correction unit 24 determines whether or not the amplitude value Vampb of the interphase voltages of the three phase basic voltage commands is larger than the determination amplitude value Jamp (1.0×Vdc); then advances to the step S305 in the case of determining that it is larger, and advances to the step S306 in the case of determining that it is not larger.

In the step S305, the voltage command correction unit 24 performs middle voltage offset processing to the three phase basic voltage commands Vub*, Vvb*, Vwb* after third order harmonic wave injection processing, and ends processing. Since middle voltage offset processing is the same as processing which replaced the three phase basic voltage commands Vub, Vvb, Vwb to the three phase basic voltage commands Vub*, Vvb*, Vwb* after third order harmonic wave injection processing in the step S101 to the step S112 of the flowchart of FIG. 2 in Embodiment 1, explanation is omitted.

On the other hand, in the step S306, the voltage command correction unit 24 sets the three phase basic voltage commands Vub*, Vvb*, Vwb* after third order harmonic wave injection processing to the final three phase voltage commands Vu, Vv, Vw directly, respectively, and ends processing.

As calculation method of the third order harmonic wave V3f, besides the method explained using the equation (4), methods explained below may be used. Specifically, as shown in the equation (6), the voltage command correction unit 24 may calculate a value obtained by multiplying −1.0 to the minimum voltage command Vmin, as the third order harmonic wave V3f.

$$V3f = V\text{min} \times (-1.0) \qquad (6)$$

Figure 24:
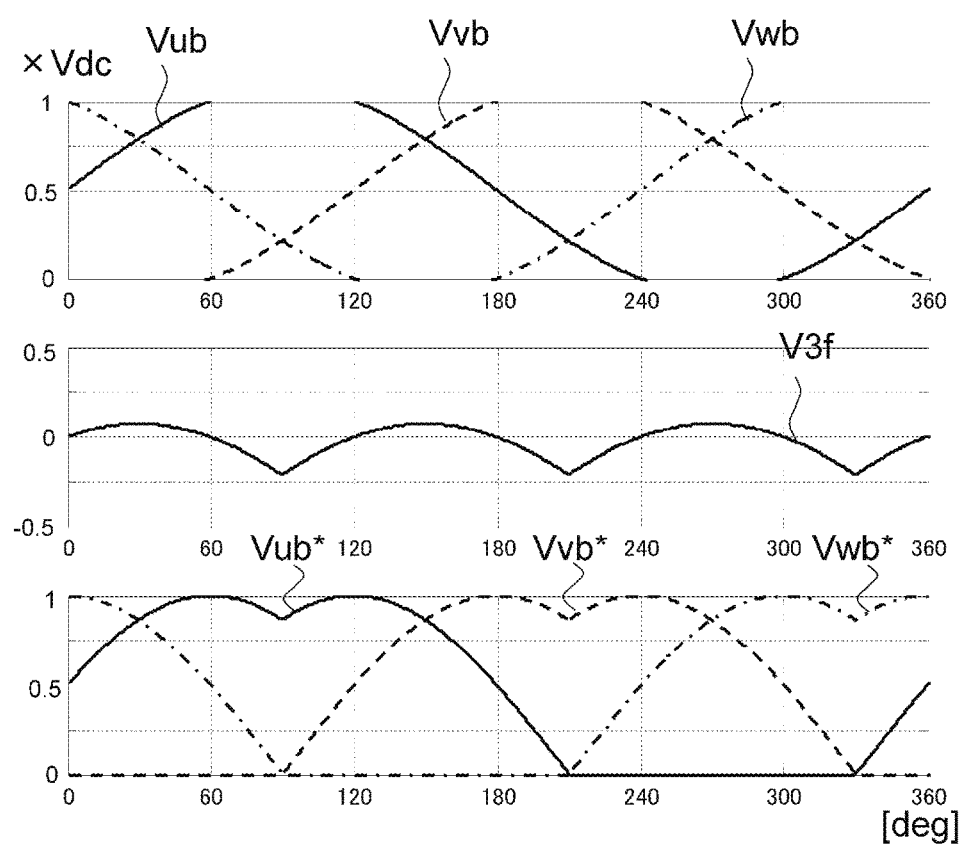
FIG. 24 is a time chart explaining a second method of third order harmonic wave injection processing according to Embodiment 3 of the present invention.

FIG. 24 shows an example in this case. The upper row of FIG. 24 shows the three phase basic voltage commands Vub, Vvb, Vwb before addition of the third order harmonic wave V3f (when the amplitude value Vampb is 100% of the DC voltage Vdc), the middle row shows the third order harmonic wave V3f calculated by the equation (6), and the lower row shows the three phase basic voltage commands Vub*, Vvb*, Vwb* after addition of the third order harmonic wave V3f. In the three phase basic voltage commands Vub*, Vvb*, Vwb* of the lower row, voltage saturation does not occur by addition of the third order harmonic wave V3f.

Alternatively, as shown in the equation (7), the voltage command correction unit 24 may calculate a value obtained by subtracting the maximum voltage command Vmax from the DC voltage Vdc, as the third order harmonic wave V3f.

$$V3f = Vdc - Vmax \quad (7)$$

Figure 25:
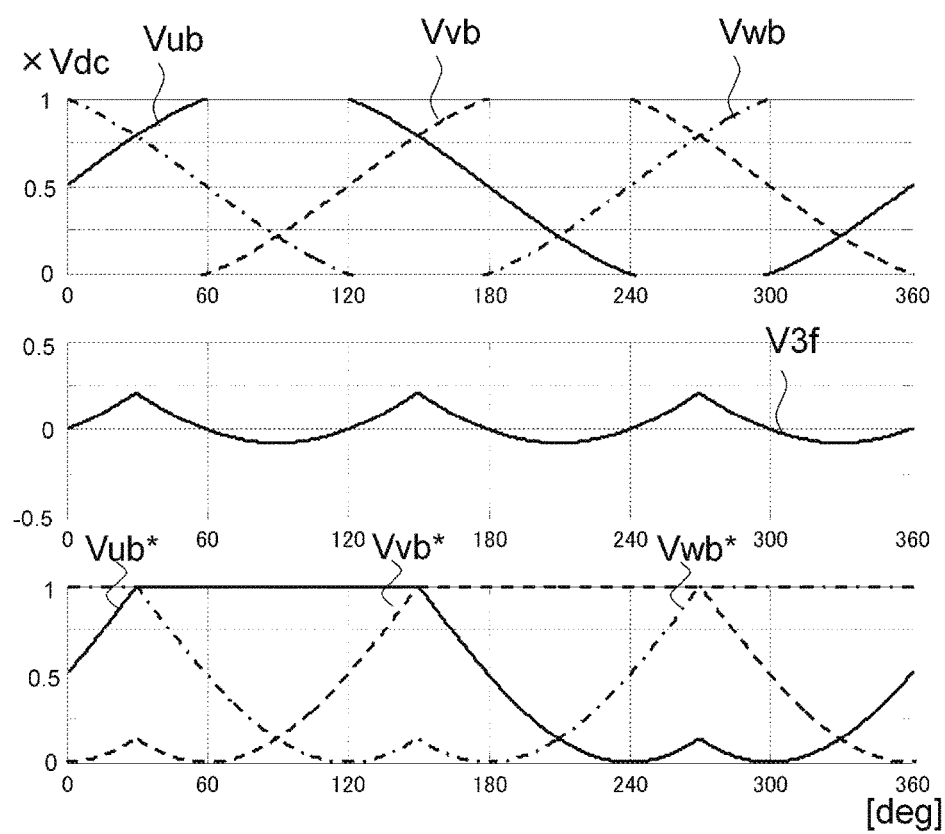
FIG. 25 is a time chart explaining a third method of third order harmonic wave injection processing according to Embodiment 3 of the present invention.

FIG. 25 shows an example in this case. The upper row of FIG. 25 shows the three phase basic voltage commands Vub, Vvb, Vwb before addition of the third order harmonic wave V3f (when the amplitude value Vampb is 100% of the DC voltage Vdc), the middle row shows the third order harmonic wave V3f calculated by the equation (7), and the lower row shows the three phase basic voltage commands Vub*, Vvb*, Vwb* after addition of the third order harmonic wave V3f. In the three phase basic voltage commands Vub*, Vvb*, Vwb* of the lower row, voltage saturation does not occur by addition of the third order harmonic wave V3f.

Alternatively, as shown in an equation (8), the voltage command correction unit 24 may calculate the third order harmonic wave V3f by the equation (6), when the third order harmonic wave V3f calculated by the equation (6) or the equation (7) is a positive value, and may calculate the third order harmonic wave V3f by the equation (7), when the third order harmonic wave V3f is a negative value.

1) In the case of V3f>=0

$$V3f = Vmin \times (-1.0)$$

2) In the case of V3f<0

$$V3f = Vdc - Vmax \quad (8)$$

Figure 26:
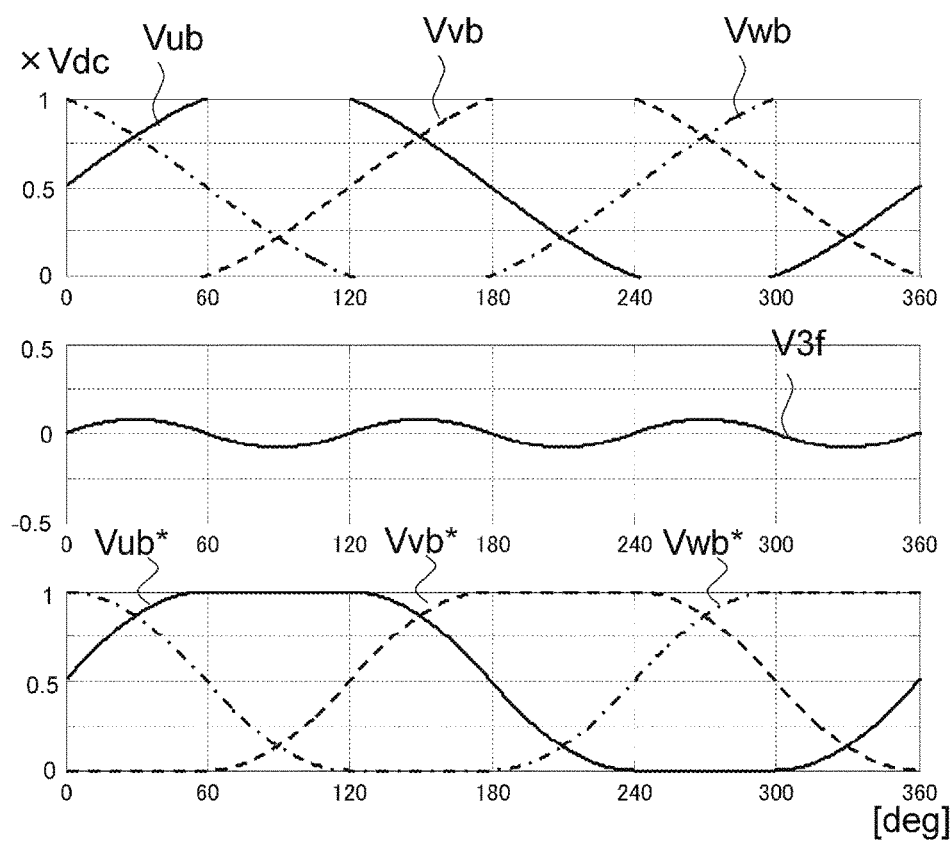
FIG. 26 is a time chart explaining a fourth method of third order harmonic wave injection processing according to Embodiment 3 of the present invention.

FIG. 26 shows an example in this case. The upper row of FIG. 26 shows the three phase basic voltage commands Vub, Vvb, Vwb before addition of the third order harmonic wave V3f (when the amplitude value Vampb is 100% of the DC voltage Vdc), the middle row shows the third order harmonic wave V3f calculated by the equation (8), and the lower row shows the three phase basic voltage commands Vub*, Vvb*, Vwb* after addition of the third order harmonic wave V3f. The lower row shows the three phase basic voltage commands Vub*, Vvb*, Vwb* after addition of the third order harmonic wave V3f. In the three phase basic voltage commands Vub*, Vvb*, Vwb* of the lower row, voltage saturation does not occur by addition of the third order harmonic wave V3f.

4. Embodiment 4

Figure 27:
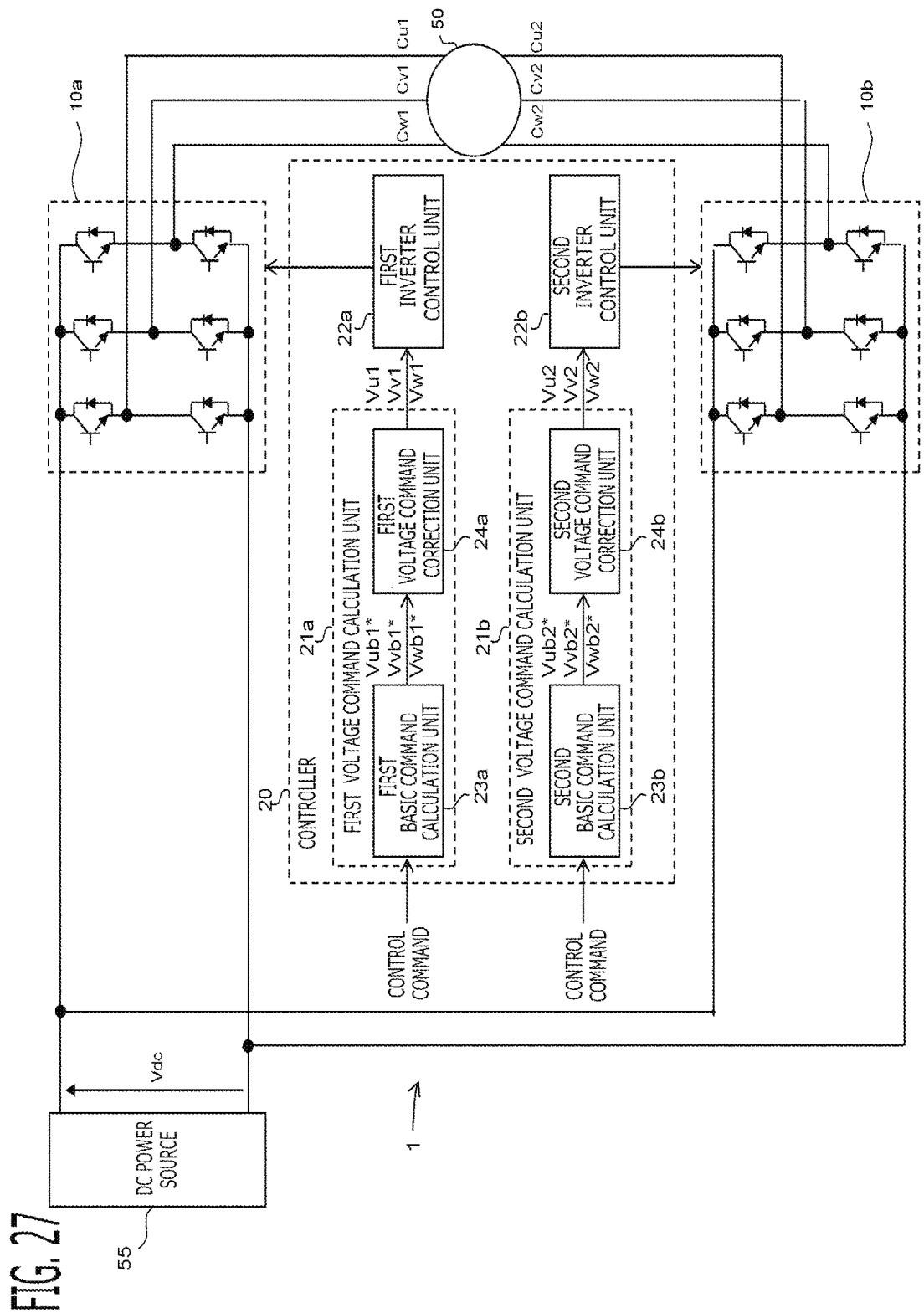
FIG. 27 is a schematic configuration diagram of an AC rotary machine control device according to Embodiment 4 of the present invention.
Figure 28:
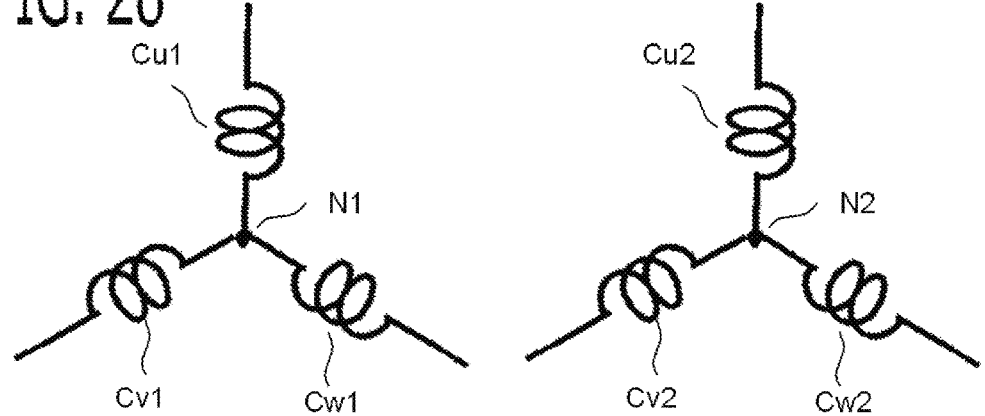
FIG. 28 is a figure showing 2 sets of three phase windings which one AC rotary machine has according to Embodiment 4 of the present invention.

Next, the control device 1 according to Embodiment 4 will be explained. The explanation for constituent parts the same as those in Embodiment 1 will be omitted. In the present embodiment, unlike Embodiment 1, two sets of the three phase windings Cu, Cv, Cw and the inverter 10 is provided for the one AC rotary machine 50. FIG. 27 is a circuit configuration diagram of the inverter 10, and a schematic block diagram of the controller 20 according to the present embodiment. As shown in FIG. 28, the AC rotary machine 50 has first three phase windings Cu1, Cv1, Cw1 connected by star connection, and second three phase windings Cu2, Cv2, Cw2 connected by star connection. The neutral point N1 of the first three phase windings Cu1, Cv1, Cw1 and the neutral point N2 of the second three phase windings Cu2, Cv2, Cw2 are not electrically connected. The first and the second three phase windings may be connected by delta connection.

The control device 1 is provided with a first inverter 10a which applies voltage to the first three phase windings Cu1, Cv1, Cw1, and a second inverter 10b which applies voltage to the second three phase windings Cu2, Cv2, Cw2. The first inverter 10a and the second inverter 10b are three phase inverters provided with the six switching devices 11 like Embodiment 1, respectively. The common DC voltage Vdc is supplied from the common DC power source 55 to the first and the second inverters 10a, 10b. Different DC voltages may be supplied from different DC power sources to the first and the second inverters 10a, 10b.

The voltage command calculation unit (the basic command calculation unit and the voltage command correction unit) and the inverter control unit with which the controller 20 is provided are configured to perform processing similar to the processing of Embodiments 1 to 3 mentioned above, for each set in parallel. Specifically, for the first set, the controller 20 is provided with a first voltage command calculation unit 21a that calculates first three phase voltage commands Vu1, Vv1, Vw1 which are voltage commands to each phase of the first three phase windings Cu1, Cv1, Cw1, and a first inverter control unit 22a that controls on/off a plurality of switching devices 11 which the first inverter 10a has, based on the DC voltage Vdc supplied to the first inverter 10a and the first three phase voltage commands Vu1, Vv1, Vw1.

For the second set, the controller 20 is provided with a second voltage command calculation unit 21b that calculates second three phase voltage commands Vu2, Vv2, Vw2 which are voltage commands to each phase of the second three phase windings Cu2, Cv2, Cw2, and a second inverter control unit 22b that controls on/off a plurality of switching devices 11 which the second inverter 10b has, based on the DC voltage Vdc supplied to the second inverter 10b and the second three phase voltage commands Vu2, Vv2, Vw2.

For the first set, the first voltage command calculation unit 21a is provided with a first basic command calculation unit 23a that calculates first three phase basic voltage commands Vub1, Vvb1, Vwb1 which are basic values of the first three phase voltage commands Vu1, Vv1, Vw1, and a first voltage command correction unit 24a that calculates the final first three phase voltage commands Vu1, Vv1, Vw1 by correcting the first three phase basic voltage commands Vub1, Vvb1, Vwb1. For the second set, the second voltage command calculation unit 21b is provided with a second basic command calculation unit 23b that calculates second three phase basic voltage commands Vub2, Vvb2, Vwb2 which are basic values of the second three phase voltage commands Vu2, Vv2, Vw2, and a second voltage command correction unit 24b that calculates the final second three phase voltage commands Vu2, Vv2, Vw2 by correcting the second three phase basic voltage commands Vub2, Vvb2, Vwb2.

The first basic command calculation unit 23a calculates the first three phase basic voltage commands Vub1, Vvb1, Vwb1 as shown in the equation (1), by V/f control, current feedback control of the first three phase windings Cu1, Cv1, Cw1, or the like. The second basic command calculation unit 23b calculates the second three phase basic voltage commands Vub2, Vvb2, Vwb2 as shown in the equation (1), by V/f control, current feedback control of the second three phase windings Cu2, Cv2, Cw2, or the like.

In the present embodiment, the first and the second voltage command calculation units 21a, 21b are configured to perform processing similar to the voltage command calculation unit 21 of Embodiment 3, respectively. Specifically, the first basic command calculation unit 23a performs third order harmonic wave injection processing that add a first third order harmonic wave V3f1, which has three times frequency of the fundamental wave component of the first three phase basic voltage commands, to each phase of the first three phase basic voltage commands Vub1*, Vvb1*, Vwb1*.

Then, the first voltage command correction unit 24a performs middle voltage offset processing to the first three phase basic voltage commands Vub1*, Vvb1*, Vwb1* after third order harmonic wave injection processing, when the amplitude value Vampb1 of the interphase voltages of the first three phase basic voltage commands is larger than the determination amplitude value Jamp obtained by multiplying 1.0 to the DC voltage Vdc. Specifically, the first voltage command correction unit 24a determines a basic voltage command of the phase which becomes a middle voltage among the first three phase basic voltage commands Vub1*, Vvb1*, Vwb1* after third order harmonic wave injection processing, as a first middle voltage command Vmid1; and performs a middle voltage offset processing that adds an first offset value Voffset1, which is set to a positive value, to the first middle voltage command Vmid1, when the first middle voltage command Vmid1 is larger than the vibration center voltage (0.5×Vdc), and subtracts the first offset value Voffset1 from the first middle voltage command Vmid1, when the first middle voltage command Vmid1 is smaller than the vibration center voltage (0.5×Vdc).

The second basic command calculation unit 23a performs third order harmonic wave injection processing that add a second third order harmonic wave V3f2, which has three times frequency of the fundamental wave component of the second three phase basic voltage commands, to each phase of the second three phase basic voltage commands Vub2*, Vvb2*, Vwb2*.

Then, the second voltages command correction unit 24b performs middle voltage offset processing to the second three phase basic voltage commands Vub2*, Vvb2*, Vwb2* after third order harmonic wave injection processing, when the amplitude value Vampb2 of the interphase voltages of the second three phase basic voltage commands is larger than the determination amplitude value Jamp obtained by multiplying 1.0 to the DC voltage Vdc. Specifically, the second voltage command correction unit 24b determines a basic voltage command of the phase which becomes a middle voltage among the second three phase basic voltage commands Vub2*, Vvb2*, Vwb2* after third order harmonic wave injection processing, as a second middle voltage command Vmid2; and performs a middle voltage offset processing that adds an second offset value Voffset2, which is set to a positive value, to the second middle voltage command Vmid2, when the second middle voltage command Vmid2 is larger than the vibration center voltage (0.5×Vdc), and subtracts the second offset value Voffset2 from the second middle voltage command Vmid2, when the second middle voltage command Vmid2 is smaller than the vibration center voltage (0.5×Vdc).

Figure 29:
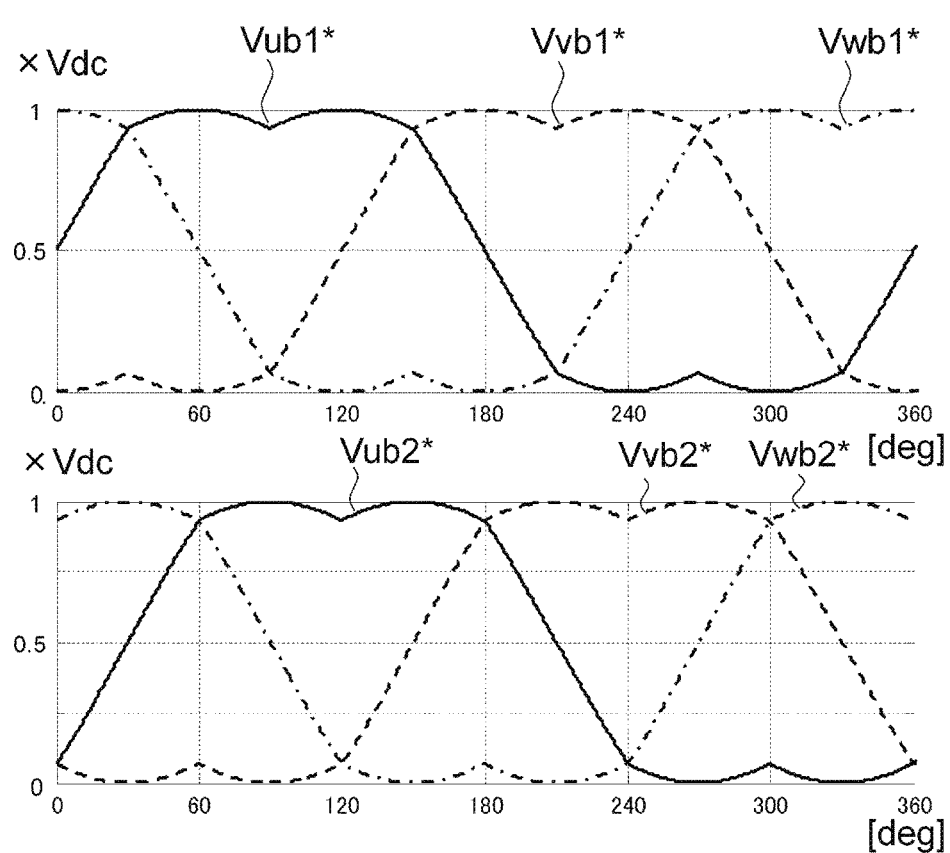
FIG. 29 is a time chart explaining phase difference which is set to the first and the second three phase basic voltage commands according to Embodiment 4 of the present invention.

In the present embodiment, unlike Embodiment 3, the first and the second basic command calculation units 23a, 23b shift a phase of a fundamental wave component of each phase of the three phase basic voltage commands by 30 degrees between the first set and the second set. An example is shown in FIG. 29. The upper row of FIG. 29 shows the first three phase basic voltage commands Vub1*, Vvb1*, Vwb1* after third order harmonic wave injection processing, and the lower row shows the second three phase basic voltage commands Vub2*, Vvb2*, Vwb2* after third order harmonic wave injection processing. As shown in this figure, there is 30 degrees phase difference between the first U phase basic voltage command Vub1* and the second U phase basic voltage command Vub2* in electrical angle, V phase and W phase are also similar.

Figure 30:
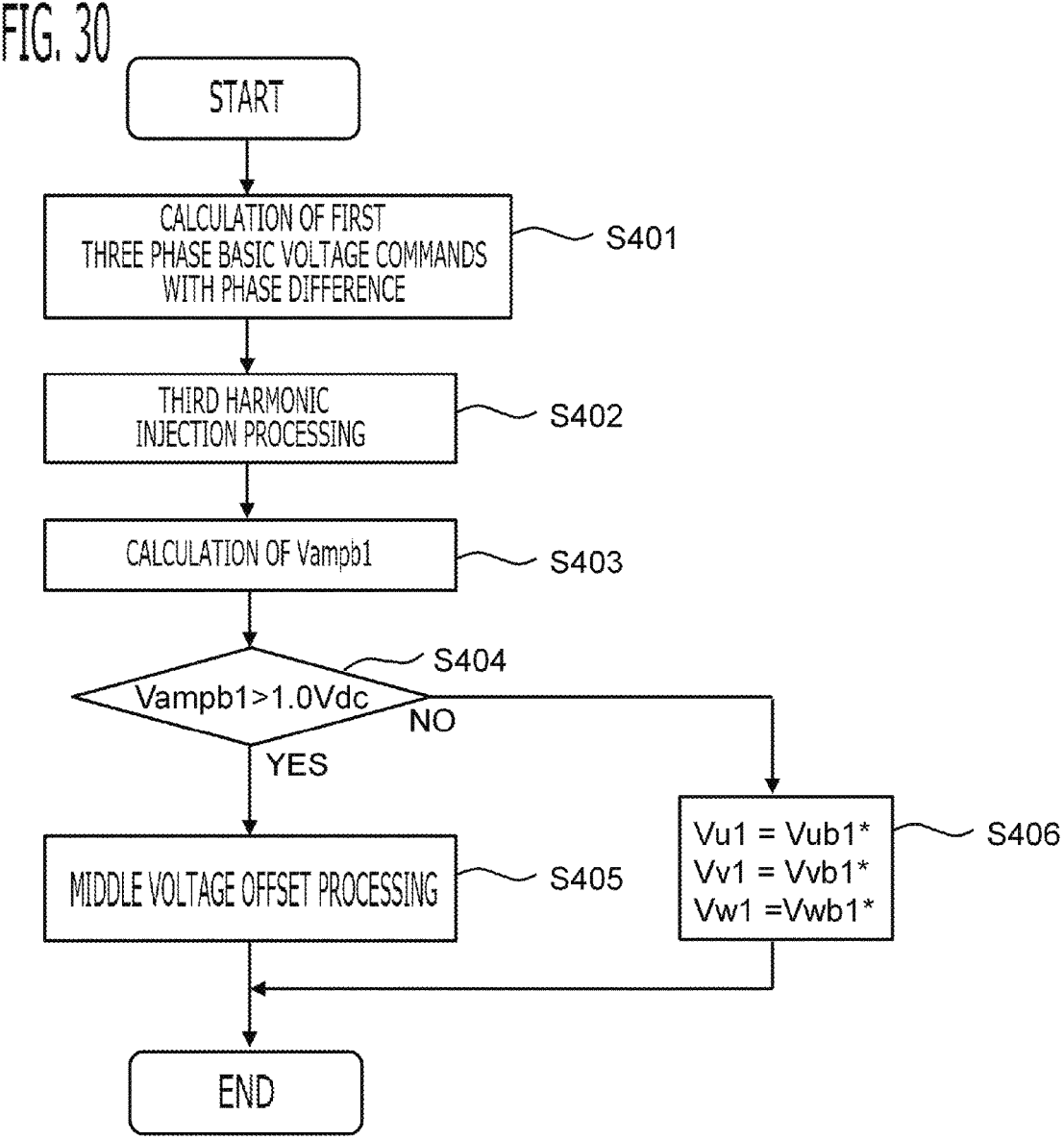
FIG. 30 is a flowchart explaining processing of a first basic command calculation unit and a first voltage command correction unit according to Embodiment 4 of the present invention.

In the present embodiment, processing of the first basic command calculation unit 23a and the first voltage command correction unit 24a is configured, as shown in the flowchart of FIG. 30. In the step S401, the first basic command calculation unit 23a calculates the first three phase basic voltage commands Vub1, Vvb1, Vwb1. At this time, the first basic command calculation unit 23a calculates the first three phase basic voltage commands Vub1, Vvb1, Vwb1 so that 30 degrees phase difference occurs between the first three phase basic voltage commands Vub1, Vvb1, Vwb1 and the second three phase basic voltage command Vub2, Vvb2, Vwb2.

Then, in the step S402, the first basic command calculation unit 23a performs third order harmonic wave injection processing to the first three phase basic voltage commands Vub1, Vvb1, Vwb1, and calculates the first three phase basic voltage commands Vub1*, Vvb1*, Vwb1* after third order harmonic wave injection processing. In the step S403, the first voltage command correction unit 24a calculates the amplitude value Vampb1 of the interphase voltages of the first three phase basic voltage commands. As is the case with Embodiment 1, as shown in the equation (2), the first voltage command correction unit 24a calculates a square root value of a value obtained by multiplying 2 to a value added square values of respective phases of the first three phase basic voltage commands Vub1*, Vvb1*, Vwb1* after third order harmonic wave injection processing, as the amplitude value Vampb1 of the interphase voltages of the first three phase basic voltage commands.

Next, in the step S404, the first voltage command correction unit 24a determines whether or not the amplitude value Vampb1 of the interphase voltages of the first three phase basic voltage commands is larger than the determination amplitude value Jamp (1.0×Vdc); then advances to the step S405 in the case of determining that it is larger, and advances to the step S406 in the case of determining that it is not larger. In the step S405, the first voltage command correction unit 24a performs middle voltage offset processing to the first three phase basic voltage commands Vub1*, Vvb1*, Vwb1* after third order harmonic wave injection processing, and ends processing. Since middle voltage offset processing is the same as processing which replaced the three phase basic voltage commands Vub, Vvb, Vwb to the first three phase basic voltage commands Vub1*, Vvb1*, Vwb1* after third order harmonic wave injection processing and replaced the three phase voltage commands Vu, Vv, Vw to the first three phase voltage commands Vu1, Vv1, Vw1 in the step S101 to the step S112 of the flowchart of FIG. 2 in Embodiment 1, explanation is omitted. On the other hand, in the step S406, the first voltage command correction unit 24a sets the first three phase basic voltage commands Vub1*, Vvb1*, Vwb1* after third order harmonic wave injection processing to the final first three phase voltage commands Vu1, Vv1, Vw1 directly, respectively, and ends processing.

Figure 31:
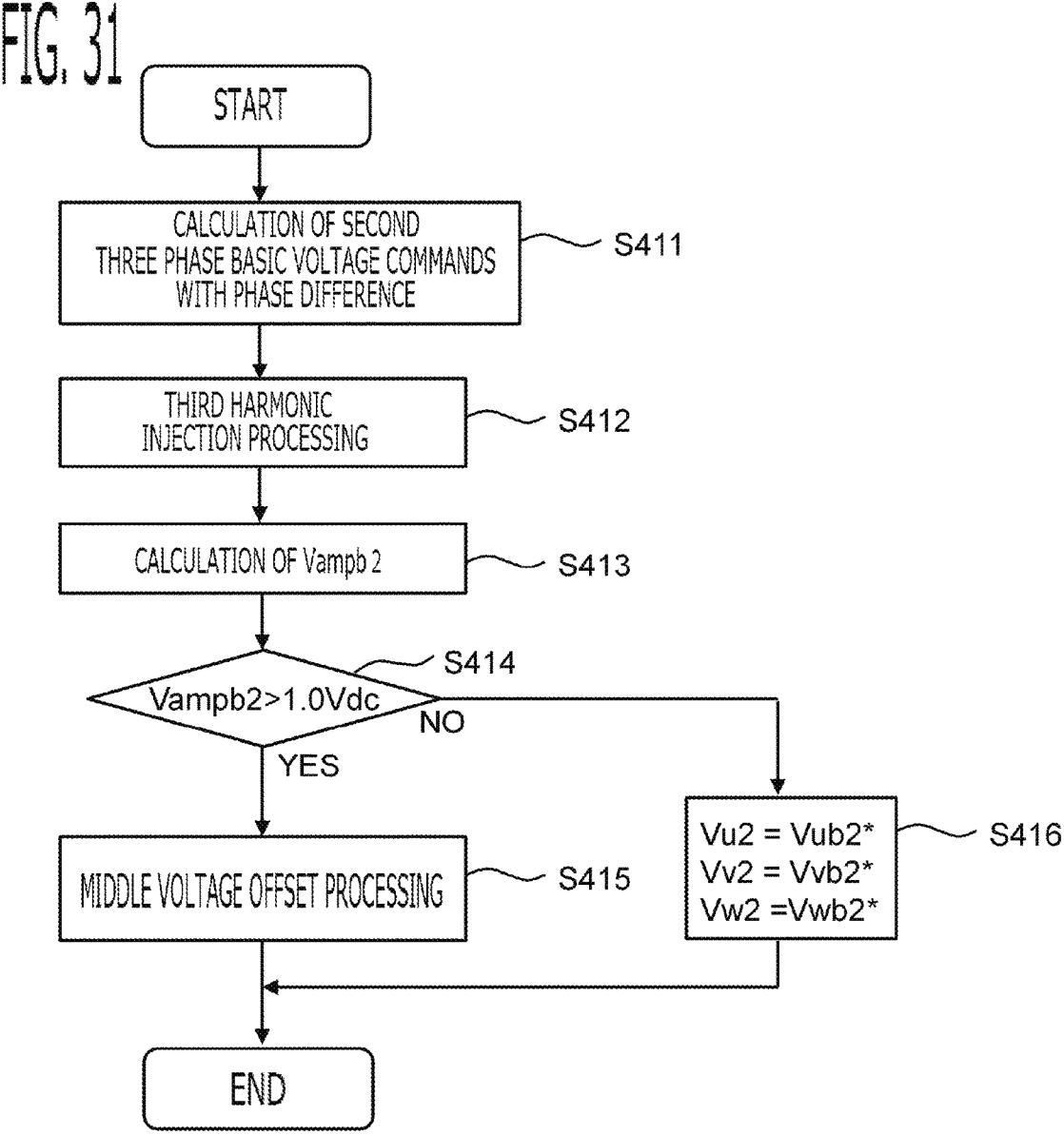
FIG. 31 is a flowchart explaining processing of a second basic command calculation unit and a second voltage command correction unit according to Embodiment 4 of the present invention.

Processing of the second basic command calculation unit 23b and the second voltage command correction unit 24b is configured, as shown in the flowchart of FIG. 31. In the step S411, the second basic command calculation unit 23b calculates the second three phase basic voltage commands Vub2, Vvb2, Vwb2. At this time, the second basic command calculation unit 23b calculates the second three phase basic voltage commands Vub2, Vvb2, Vwb2 so that 30 degrees phase difference occurs between the first three phase basic voltage commands Vub1, Vvb1, Vwb1 and the second three phase basic voltage commands Vub2, Vvb2, Vwb2.

Then, in the step S412, the second basic command calculation unit 23b performs third order harmonic wave injection processing to the second three phase basic voltage commands Vub2, Vvb2, Vwb2, and calculates the second three phase basic voltage commands Vub2*, Vvb2*, Vwb2* after third order harmonic wave injection processing. In the step S413, the second voltage command correction unit 24b calculates the amplitude value Vampb2 of the interphase voltages of the second three phase basic voltage commands. As is the case with Embodiment 1, as shown in the equation (2), the second voltage command correction unit 24b calculates a square root value of a value obtained by multiplying 2 to a value added square values of respective phases of the second three phase basic voltage commands Vub2*, Vvb2*, Vwb2* after third order harmonic wave injection processing, as the amplitude value Vampb2 of the interphase voltages of the second three phase basic voltage commands.

Next, in the step S414, the second voltage command correction unit 24b determines whether or not the amplitude value Vampb2 of the interphase voltages of the second three phase basic voltage commands is larger than the determination amplitude value Jamp (1.0×Vdc); then advances to the step S415 in the case of determining that it is larger, and advances to the step S416 in the case of determining that it is not larger. In the step S415, the second voltage command correction unit 24b performs middle voltage offset processing to the second three phase basic voltage commands Vub2*, Vvb2*, Vwb2* after third order harmonic wave injection processing, and ends processing. Since middle voltage offset processing is the same as processing which replaced the three phase basic voltage commands Vub, Vvb, Vwb to the second three phase basic voltage commands Vub2*, Vvb2*, Vwb2* after third order harmonic wave injection processing and replaced the three phase voltage commands Vu, Vv, Vw to the second three phase voltage commands Vu2, Vv2, Vw2 in the step S101 to the step S112 of the flowchart of FIG. 2 in Embodiment 1, explanation is omitted. On the other hand, in the step S416, the second voltage command correction unit 24b sets the second three phase basic voltage commands Vub2*, Vvb2*, Vwb2* after third order harmonic wave injection processing to the final second three phase voltage commands Vu2, Vv2, Vw2 directly, respectively, and ends processing.

Then, the effect of Embodiment 4 is explained. As explained in Embodiment 3, when the amplitude value Vampb of the interphase voltages of the three phase basic voltage commands becomes larger than 100% of the DC voltage Vdc, although the 5th order, the 7th order, the 11th order, and the 13th order harmonic wave components cause in the interphase voltages of the three phase basic voltage commands after third order harmonic wave injection processing, the 11th order and the 13th order harmonic wave components can be reduced by performing middle voltage offset processing. Here, the 5th order and the 7th order harmonic wave components become the 6th harmonic wave component by converting into the dq-axis rotating coordinate system, and the 11th order and the 13th order harmonic wave components become the 12th order harmonic wave component by converting into the dq-axis rotating coordinate system. Accordingly, the 12th order harmonic wave component in the dq-axis rotating coordinate system can be reduced by middle voltage offset processing.

On the other hand, the 6th order harmonic wave component in the dq-axis rotating coordinate system can be reduced by setting 30 degrees phase difference between the first three phase basic voltage commands Vub1, Vvb1, Vwb1 and the second three phase basic voltage commands Vub2, Vvb2, Vwb2. Specifically, 30 degrees phase difference in phase (electrical angle) of the 1st order fundamental wave component corresponds to 30×A degrees phase difference in phase of the Ath order component, and corresponds to 30×6=180 degrees phase difference in phase of the 6th order component. Accordingly, the 6th order component of the interphase voltages of the first three phase basic voltage commands and the 6th order component of the interphase voltage of the second three phase basic voltage commands can be canceled with each other.

In the case where m (m is a natural number) sets of the three phase windings Cu, Cv, Cw and the inverter 10 are provided, by shifting the phase of the three phase basic voltage commands of each set by 60/m degrees, the phase of the 6th order component shifts by 360/m degrees. When m sets of 6th order components are summed up, these can be balanced and canceled with each other in 360 degrees.

As described above, the 6th order and the 12th order harmonic wave components in the dq-axis rotating coordinate system, which cause when the amplitude value of the interphase voltages of the three phase basic voltage commands becomes larger than 100% of the DC voltage Vdc, can be significantly reduced by middle voltage offset processing and phase difference setting between each set of the three phase basic voltage commands. Generally, since current on a dq-axis rotating coordinate system is current which contributes to torque, the 6th order and the 12th order harmonic voltage components in the dq-axis rotating coordinate system become torque ripples of those order, and become a factor causing vibration and noise. According to the present embodiment, even when the amplitude value of the interphase voltages of the three phase basic voltage commands becomes larger than 100% of the DC voltage Vdc, torque ripple, vibration, and noise of the AC rotary machine 50 can be reduced.

5. Embodiment 5

Next, an electric power steering device 60 according to Embodiment 5 will be explained. The electric power steering device 60 is provided with the AC rotary machine control device 1 which was explained in Embodiments 1 to 4, the AC rotary machine 50, and a driving force transmission mechanism 61 that transmits a driving force of the AC rotary machine 50 to a steering device of a vehicle.

Figure 32:
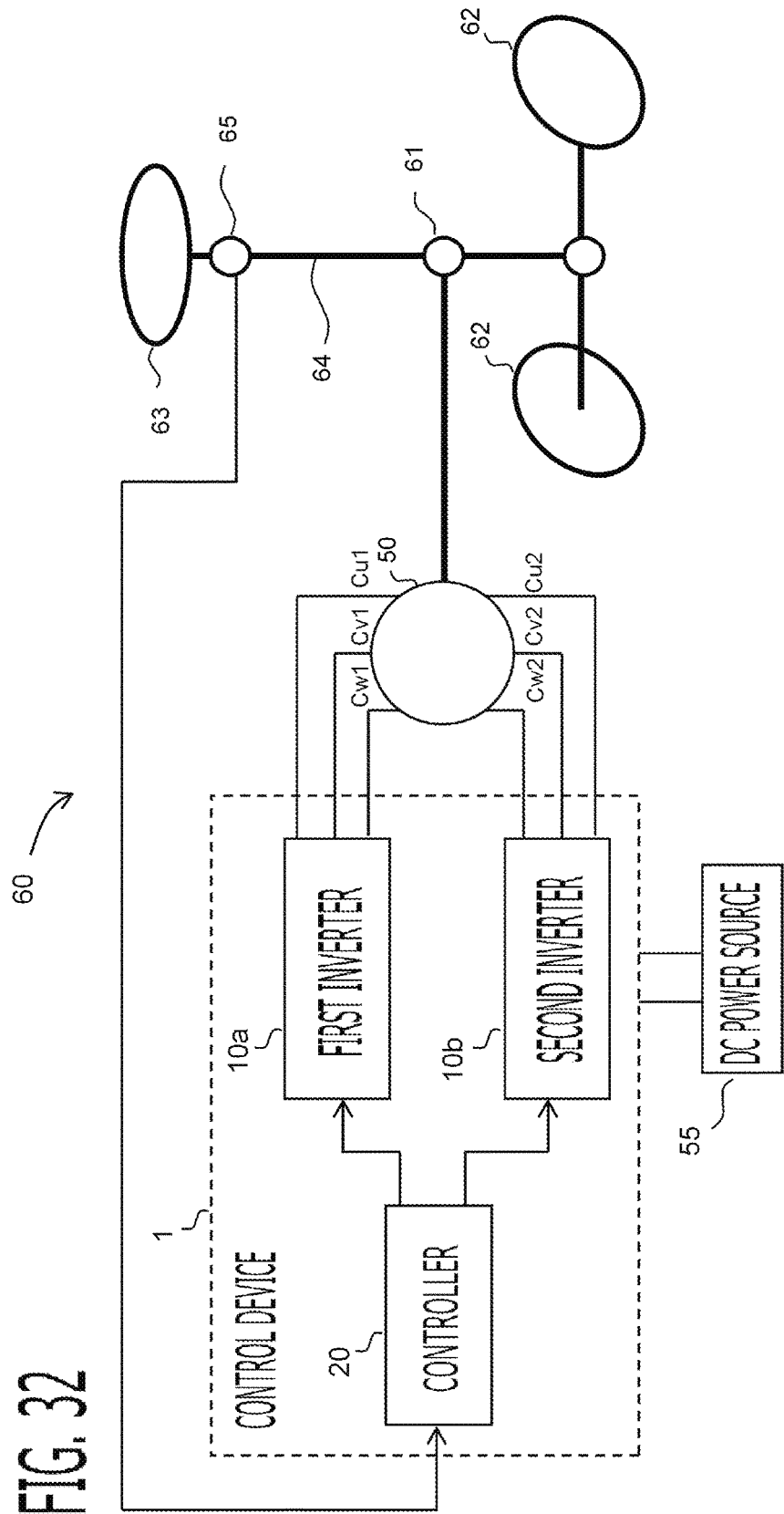
FIG. 32 is a schematic configuration diagram of an electric power steering device according to Embodiment 5 of the present invention.

FIG. 32 is a configuration diagram of the electric power steering device 60 according to the present embodiment. The electric power steering device is provided with a handle 63 that a driver rotates right and left, a shaft 64 that is connected with the handle 63 and transmits a steering wheel torque by the handle 63 to a steering mechanism of a front wheel 62, a torque sensor 65 that is mounted on the shaft 64 and detects the steering wheel torque by the handle 63, and a driving force transmission mechanisms 61, such as a worm gear mechanism, which transmits a driving torque of the AC rotary machine 50 to the shaft 64.

The control device 1 is configured to make the AC rotary machine 50 output torque according to the steering wheel torque of the handle 63 detected by the torque sensor 65, and make the AC rotary machine 50 output torque which assists the steering wheel torque by the handle 63. Specifically, the basic command calculation unit 23 of the controller 20 sets the d-axis current command and the q-axis current command in the dq-axis rotating coordinate system, according to the steering wheel torque of the handle 63 detected by the torque sensor 65, and calculates the three phase basic voltage commands by current feedback control using vector control method explained in Embodiment 1.

If the AC rotary machine 50 and the control device 1 are configured like Embodiment 4, also in a high-voltage operating range where the amplitude value of the interphase voltages of the three phase basic voltage commands exceeds the DC voltage Vdc, the torque ripple of the 6th order and the 12th order components, vibration, and noise can be reduced by middle voltage offset processing and phase difference setting between each set of the three phase basic voltage commands. Accordingly, a higher power can be achieved, while reducing noise and vibration which the electric power steering device 60 causes, and reducing discomfort to a driver and a passenger.

Since middle voltage offset processing is realized by the simple calculation processing which adds or subtracts the offset value Voffset to the middle voltage command, a cheap computing processing unit with slow calculation processing speed can be used, and cost reduction of the electric power steering device 60 can be achieved.

<Other Embodiments>

Lastly, other embodiments of the present invention will be explained. Each of the configurations of embodiments to be explained below is not limited to be separately utilized but can be utilized in combination with the configurations of other embodiments as long as no discrepancy occurs.

(1) There has been explained the case where one set of the three phase windings Cu, Cv, Cw and the inverter 10 is provided for the one AC rotary machine 50 in above-mentioned Embodiments 1 to 3, and 2 sets are provided in Embodiments 4 and 5. However, m (m is a natural number) sets of the three phase windings Cu, Cv, Cw and the inverter 10 may be provided for the one AC rotary machine 50, and m may be set to a natural number greater than or equal to three. Then, for each set of m sets, the voltage command calculation unit 21 may calculate the three phase voltage commands Vu, Vv, Vw by a method similar to Embodiments 1 to 4. For each set of m sets, the inverter control unit 22 may controls on/off of a plurality of switching devices 11 of the inverter 10, based on a DC voltage Vdc and the three phase voltage commands Vu, Vv, Vw. For each set of m sets, the basic command calculation unit 23 may calculate the three phase basic voltage commands Vub, Vvb, Vwb by a method similar to Embodiments 1 to 4. For each set of m sets, the basic command calculation unit 23 may perform third order harmonic wave injection processing by a method similar to Embodiments 3 and 4. For each set of m sets, the voltage command correction unit 24 may correct the three phase basic voltage commands Vub, Vvb, Vwb by middle voltage offset processing to calculate the final three phase voltage commands Vu, Vv, Vw by a method similar to Embodiments 1 to 4.

(2) In each of the above-mentioned Embodiments, there has been explained the case where the three phase basic voltage commands Vub, Vvb, Vwb are waveforms of cosine wave (or sine wave). However, the three phase basic voltage commands Vub, Vvb, Vwb may be waveforms which the harmonic wave component for estimation of the magnetic pole position and the like superimposed on cosine wave (or sine wave).

(3) In the above-mentioned Embodiment 4, there has been explained the case where two sets of the three phase windings Cu, Cv, Cw and the inverter 10 is provided for the one AC rotary machine 50, and the first and the second basic command calculation units 23a, 23b shift a phase of a fundamental wave component of each phase of the three phase basic voltage commands by 30 degrees between the first set and the second set. However, m (m is a natural number) sets of the three phase windings Cu, Cv, Cw and the inverters 10 may be provided for the one AC rotary machine, the m sets may be greater than or equal to 2 sets, and the basic command calculation unit may shift a phase of a fundamental wave component of each phase of the three phase basic voltage commands by 60/m degrees between each set. Even if configured in this way, as explained in the last of Embodiment 4, the 6th order harmonic wave component of each set can be canceled with each other.

(4) In the above-mentioned Embodiment 5, there has been explained the case where the control device 1 is used for the electric power steering device 60. However, the control device 1 may be used for device other than electric power steering device 60.

Various modifications and alterations of this invention will be apparent to those skilled in the art without departing from the scope and spirit of this invention, and it should be understood that this is not limited to the illustrative embodiments set forth herein.

INDUSTRIAL APPLICABILITY

This invention can be used suitably for an AC rotary machine control device, and an electric power steering device provided with the same.

REFERENCE SIGNS LIST

1: AC Rotary Machine Control Device, 10: Inverter, 11: Switching Device, 20: Controller, 21: Voltage Command Calculation Unit, 22: Inverter Control Unit, 23: Basic Command Calculation Unit, 24: Voltage Command Correction Unit, 50: AC Rotary Machine, 55: DC Power Source, 60: Electric Power Steering Device, 61: Driving Force Transmission Mechanism, Cu, Cv, Cw: Three phase windings, V3f: Third order harmonic wave, Vampb: Amplitude value of interphase voltages of three phase basic voltage commands, Vdc: DC voltage, Vmid: Middle voltage command, Voffset: Offset value, Vu, Vv, Vw: Three phase voltage commands, Vub, Vvb, Vwb: Three phase basic voltage commands

The invention claimed is:

1. An AC rotary machine control device comprising:
at least one inverter that applies voltage to three phase windings which an AC rotary machine has, and a controller that controls the at least one inverter,
wherein m (m is a natural number) sets of the three phase windings and the inverters are provided for the one AC rotary machine,
wherein the controller is provided with
a voltage command calculator that, for each set of the m sets, calculates three phase voltage commands which are voltage commands to respective phases of the three phase windings; and
an inverter controller that, for each set, controls on/off of a plurality of switching devices which the inverter has, based on a DC voltage supplied to the inverter and the three phase voltage commands,
wherein the voltage command calculator is provided with
a basic command calculator that, for each set, calculates three phase basic voltage commands which are basic values of the three phase voltage commands; and
a voltage command correction calculator that calculates the final three phase voltage commands by correcting the three phase basic voltage commands, and
wherein the voltage command correction calculator, for each set, determines a basic voltage command of a phase which becomes a middle voltage among the three phase basic voltage commands, as a middle voltage command; and performs middle voltage offset processing that adds an offset value, which is set to a positive value, to the middle voltage command, when the middle voltage command is larger than vibration center voltage, and subtracts the offset value from the middle voltage command, when the middle voltage command is smaller than the vibration center voltage.

2. The AC rotary machine control device according to claim 1,
wherein the voltage command correction calculator, for each set, performs the middle voltage offset processing, when an amplitude value of interphase voltages of the three phase basic voltage commands is larger than a determination amplitude value obtained by multiplying 0.866 to the DC voltage.

3. The AC rotary machine control device according to claim 1,
wherein the basic command calculator, for each set, performs third order harmonic wave injection processing that add a third order harmonic wave, which has three times frequency of a fundamental wave component of the three phase basic voltage commands, to each phase of the three phase basic voltage commands, and
wherein the voltage command correction calculator, for each set, performs the middle voltage offset processing to the three phase basic voltage commands after the third order harmonic wave injection processing, when an amplitude value of interphase voltages of the three phase basic voltage commands is larger than the determination amplitude value obtained by multiplying 1.0 to the DC voltage.

4. The AC rotary machine control device according to claim 3,
wherein the basic command calculator calculates the third order harmonic wave based on at least one of a maximum voltage command which is a basic voltage command of a phase which becomes a maximum voltage among the three phase basic voltage commands, and a minimum voltage command which is a basic voltage command of a phase which becomes a minimum voltage among the three phase basic voltage commands.

5. The AC rotary machine control device according to claim 1,
wherein the voltage command correction changes the offset value according to an amplitude value of interphase voltages of the three phase basic voltage commands.

6. The AC rotary machine control device according to claim 1,
wherein the m sets are greater than or equal to 2 sets, and
wherein the basic command calculator shifts a phase of a fundamental wave component of each phase of the three phase basic voltage commands by 60/m degrees between each set.

7. An electric power steering device comprising:
the AC rotary machine control device according to claim 1,
the AC rotary machine, and
a driving force transmission mechanism that transmits a driving force of the AC rotary machine to a steering device of a vehicle.

8. The AC rotary machine control device according to claim 1, wherein the vibration center voltage is 0.5×the DC voltage supplied to the at least one inverter.

9. The AC rotary machine control device according to claim 1, wherein the vibration center voltage is based on the DC voltage supplied to the at least one inverter.

* * * * *